US011857492B2

(12) United States Patent
Omura

(10) Patent No.: US 11,857,492 B2
(45) Date of Patent: Jan. 2, 2024

(54) TABLET CASSETTE

(71) Applicant: TOSHO INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 784 days.

(21) Appl. No.: 16/971,388

(22) PCT Filed: Feb. 20, 2019

(86) PCT No.: PCT/JP2019/006413
§ 371 (c)(1),
(2) Date: Aug. 20, 2020

(87) PCT Pub. No.: WO2019/163854
PCT Pub. Date: Aug. 29, 2019

(65) Prior Publication Data

US 2021/0022960 A1 Jan. 28, 2021

(30) Foreign Application Priority Data

Feb. 21, 2018 (JP) ................................ 2018-028485
Nov. 2, 2018 (JP) ................................ 2018-207749
Nov. 2, 2018 (JP) ................................ 2018-207750

(51) Int. Cl.
*A61J 1/03* (2023.01)
*B65B 35/06* (2006.01)
(Continued)

(52) U.S. Cl.
CPC ................ *A61J 1/03* (2013.01); *B65B 35/06* (2013.01); *B65B 35/46* (2013.01); *G07F 17/0092* (2013.01)

(58) Field of Classification Search
CPC ..... G07F 17/0092; B65B 5/103; A61J 7/0076
(Continued)

(56) References Cited

U.S. PATENT DOCUMENTS 6,073,799 A 6/2000 Yuyama et al.
9,181,017 B2 11/2015 Bae et al.
(Continued)

FOREIGN PATENT DOCUMENTS

CN 1860062 A 11/2006
CN 2007-136238 A 6/2007
(Continued)

OTHER PUBLICATIONS

International Search Report, dated May 21, 2019 (May 21, 2019), 2 pages.
(Continued)

*Primary Examiner* — Timothy R Waggoner
(74) *Attorney, Agent, or Firm* — Rankin, Hill & Clark LLP

(57) ABSTRACT

A tablet cassette that inhibits rotation of a rotor when the tablet cassette is not mounted. A plurality of engaged portions are provided, about the axial line of a rotary shaft at predetermined intervals in the circumferential direction on an annular inner surface region of a bottom wall portion located a predetermined distance away from the rotary shaft. A sliding shaft is disposed in the rotary shaft, slidable in the axial direction, such that the sliding shaft rotates together with the rotary shaft. The rotary shaft is displaced toward a rotor body when the rotary shaft is coupled to a drive shaft and the rotary shaft is displaced toward a bottom wall portion when the rotary shaft is not coupled to the drive shaft. Two or more engaging portions are provided on arm portions provided on the sliding shaft and engage with some of a plurality of engaged portions.

13 Claims, 23 Drawing Sheets

(51) Int. Cl.
*B65B 35/46* (2006.01)
*G07F 17/00* (2006.01)

(58) Field of Classification Search
USPC .................................................. 221/151, 248
See application file for complete search history.

(56) References Cited

U.S. PATENT DOCUMENTS

| | | | | |
|---|---|---|---|---|
| 2011/0163112 | A1* | 7/2011 | Takahama | G07F 17/0092 221/277 |
| 2011/0309101 | A1* | 12/2011 | Kokie | B65B 63/00 221/30 |
| 2014/0203034 | A1* | 7/2014 | Bae | G07F 17/0092 221/195 |
| 2019/0021955 | A1* | 1/2019 | Omura | G07F 17/0092 |
| 2023/0157929 | A1* | 5/2023 | Omura | A61J 3/00 221/277 |

FOREIGN PATENT DOCUMENTS

| | | | |
|---|---|---|---|
| CN | 103228538 | A | 7/2013 |
| CN | 103910143 | A | 7/2014 |
| CN | 105744923 | A | 7/2016 |
| EP | 1676778 | A1 | 7/2006 |
| EP | 2644512 | A2 | 10/2013 |
| EP | 3047834 | A1 | 7/2016 |
| JP | H09-323702 | A | 12/1997 |
| JP | 2002-272812 | | 9/2002 |
| JP | 2012-120719 | | 6/2012 |
| JP | 2012-179127 | | 9/2012 |
| JP | 2014-140615 | A | 8/2014 |
| JP | 2016-140724 | | 8/2016 |
| JP | 2017-127532 | | 7/2017 |
| WO | 2017/126670 | A1 | 7/2017 |

OTHER PUBLICATIONS

International Search Report dated May 21, 2019, PCT/JP2019/006413, 2 pages.

Supplementary European Search Report dated Oct. 8, 2021, EP 19756826, 2 pages.

Chinese Office Action dated Jan. 27, 2022, CN 2022012401744200, 9 pages.

* cited by examiner

TABLET CASSETTE

TECHNICAL FIELD

The present invention relates to a tablet cassette that constitutes a driven portion in a tablet feeder that automates dispensing of medicine performed in hospitals, pharmacies, and so forth.

BACKGROUND ART

There have hitherto been proposed tablet cassettes for tablet feeders with various structures described in Patent Documents 1 to 5. FIGS. 19A to 19D and FIGS. 20A and 20B illustrate a tablet cassette 20' for a conventional typical tablet feeder 10' according to the related art described in Japanese Unexamined Patent Application Publication No. 2002-272812 (Patent Document 1) The tablet feeder 10' is composed of a drive portion 30' that is used in the state of being attached to a drawing shelf or the like of a tablet dispensing apparatus for power supply and control, and the tablet cassette 20' which is removably mounted to the drive portion 30' to facilitate tablet replenishment work or the like. A large number of tablets 8' are contained in the tablet cassette 20' in a random manner, and the drive portion 30' is caused to intermittently or continuously operate, as necessary, to feed the tablets 8', one by one, from the tablet cassette 20'.

The tablet cassette 20' (see FIG. 19B) of such a tablet feeder 10' includes: a tablet container 21' configured to contain a large number of tablets 8', which are supplied with its upper lid opened, in the internal space of the tablet container 21'; a rotor 22' axially rotatably provided at the inner bottom portion of the internal space of the tablet container 21'; a rotary shaft 23' provided to project from the center of the lower end portion of the rotor 22', and configured to be meshed with a drive shaft 33' of the drive portion 30', to be discussed in detail later, to transmit axial rotational motion of the drive shaft 33' to the rotor 22' when the tablet cassette 20' is mounted to the drive portion 30'; and a partition member 25' provided to face a discharge port 24' formed to penetrate the bottom wall portion of the tablet container 21' which defines the lower end portion of an annular gap formed between the tablet container 21' and the rotor 22', and configured to partition a part of the annular gap on the upper end side. In order to partition the annular gap, in which the tablets 8' are to be aligned, into spaces for one tablet each, the rotor 22' is provided with a plurality of partition walls 22'a in a blade shape at equal intervals on the outer peripheral portion of the rotor 22 to project into the annular gap, and spaces between adjacent partition walls 22'*a*, 22'*a* serve as tablet receiving spaces 22*b'* configured to each tablet 8', or a vertical array of tablets, that has fallen from the upper surface of the rotor 22'. The partition member 25' is prepared from any of various materials such as a plate material or a soft material. The partition member 25' is fixed at an installation position after the position of the partition member 25' in the height direction is adjusted such that the lowermost tablet 8' in the tablet containing space 22' *b* can be, separated from the upper tablets 8'.

Such a tablet cassette 20' handles tablets, and does not handle powdered medicine in a powder particle form. While tablets in a circular plate shape (circular tablet 8' illustrated in FIG. 19A) are typical, the tablet cassette often handles tablets in a regular polygon plate shape, capsules in a cylindrical shape in which powdered medicine is encapsulated, etc.

In addition, the tablet cassette occasionally handles odd shaped tablets in a diamond plate shape, odd shaped tablets in a spindle shape with a swelled middle portion, half tablets prepared by splitting each tablet into two halves by cutting or the like to allow taking less than one tablet at a time, etc., rather than so-called regular shaped tablets such as those in a circular shape, a spherical shape, a regular polygon shape, and a regular polyhedron shape.

Meanwhile, the drive portion 30' includes 17 • a substrate 31' securely or replaceably attached to a shelf, a housing, or the like. A motor 32' as a rotational drive source and the drive shaft 33' which is configured to transmit the rotational drive force of the motor 32' to the outside are mounted on the substrate 31' to rotationally drive the rotor 22' with respect to the tablet cassette 20' which is mounted to the drive portion 30'. A discharge sensor 34' is provided at the middle or the end of a discharge path, in order to detect whether or not the tablets are discharged or count the discharged tablets.

When the tablet cassette 20' is mounted to the drive portion 30', the rotary shaft 23' and the drive shaft 33' are coupled to each other through fitting or the like to enable cooperation. When the motor 32' is driven in accordance with control by a control device (not illustrated) and the transmission mechanisms (23' and 33') and further the rotor 22' are rotated accordingly, the tablets 8 are fed to the discharge port 24' to fall down one by one.

Further, the rotary shaft 23' and the drive shaft 33' must be loosely fitted with each other with a play to allow smooth insertion and extraction. If the transmission mechanisms 23' and 33' are simply fitted with each other, the transmission mechanisms 23' and 33' are not coupled to each other to enable transmission of rotation. Thus, the transmission mechanisms 23' and 33' are meshed with each other as they are fitted with each other. Specifically (see FIG. 20A), the rotary shaft 23' includes an internal gear, and the drive shaft 33' includes an external gear to be meshed with the internal gear. When the two shafts (23' and 33') are moved relative to each other in the rotational axis direction with their axes matching each other to reduce the relative distance therebetween, the shafts 23' and 33' are meshed with each other at the same time as they are fitted with each other.

After the tablet cassette 20' is removed, the tooth positions of the shafts 23' and 33' often deviate from each other (see FIG. 20B). An angle φ of the deviation may reach up to half an angle φ of the pitch of the teeth. With such deviation, the rotary shaft 23' may be rotated to incur undesired out-of-control discharge operation when the rotary shaft 23' and the drive shaft 33' are fitted with each other. Thus, in some tablet cassettes (see Patent Document 5, for example), an engagement ember or the like configured to engage the rotary shaft 23' with the tablet container 21' is added to the tablet cassette 20', and engagement is enabled/disabled as the tablet cassette 20' is detached from/mounted to the drive portion 30', in order to positively suppress unwanted rotation of the rotary shaft 23'.

RELATED-ART DOCUMENT

Patent Document

Patent Document 1: Japanese Unexamined Patent Application Publication No. 2002-272812
Patent Document 2: Japanese Unexamined Patent Application Publication No. 2012-179127
Patent Document 3: Japanese Unexamined Patent Application Publication No. 2012-120719

Patent Document 4: Japanese Unexamined Patent Application Publication No. 2016-140724

Patent Document 5: Japanese Unexamined Patent Application Publication No. 2017-127532

SUMMARY OF INVENTION

Technical Problem

In the tablet cassette 20' described in Patent Document 5, undesired out-of-control rotation is not caused even when the tablet cassette 20' is mounted to the drive portion 30' and the rotary shaft 23' is fitted with the drive shaft 33'.

In order to implement so to speak "non-mounted-time rotation inhibition means" for inhibiting rotation of the rotary shaft by itself when the rotor 22' is not mounted (see Patent Document 5), it is necessary to additionally mount, in addition to the annular engagement member with a large number of teeth, a swing member to be engaged with the engagement member, a swing support point for the swing member, a biasing member, and so forth in the cassette. Since the members are small, delicate, and difficult to prepare and should be handled with care, in addition, an increase in the manufacture cost is inevitable.

An object of the present invention is to provide a tablet cassette with simple means for inhibiting rotation of a rotor when the tablet cassette is not mounted, in order to suppress a cost increase.

Solution to Problem

The present invention improves a tablet cassette including: a tablet container including a tablet containing space therein for containing a plurality of tablets in a random manner, and a bottom wall portion having a discharge port to allow the plurality of tablets in the tablet containing space to fall down one by one; a rotary shaft configured to penetrate the bottom wall portion with an axial line of the rotary shaft extending in a direction that is orthogonal to the bottom wall portion and to be connected to a drive shaft; and a rotor including a rotor body configured to rotate about the axial line together with the rotary shaft in the tablet containing space of the tablet container and having a plurality of tablet receiving portions provided in an outer peripheral portion of the rotor body at predetermined intervals in a circumferential direction to respectively receive the tablet and to allow the tablet to pass therethrough to the discharge port.

In the tablet cassette according to the present invention, the rotary shaft is hollow. The tablet cassette further includes: a plurality of engaged portions continuously provided about the axial line of the rotary shaft at predetermined intervals in the circumferential direction on an annular inner surface region of the bottom wall portion located a predetermined distance away from the rotary shaft, a sliding shaft disposed inside the rotary shaft to rotate together with the rotary shaft and to be slidable in the axial direction to be displaced toward the rotor body when the rotary shaft is coupled to the drive shaft and displaced toward the bottom wall portion when the rotary shaft is not coupled to the drive shaft, and two or more engaging portions provided on the sliding shaft to be engaged with some of the plurality of engaged portions. The rotary shaft and the sliding shaft are operably supported such that the two or more engaging portions are not engaged with the plurality of engaged portions when the rotary shaft is coupled to the drive shaft and the two or more engaging portions are engaged with the plurality of engaged portions when the rotary shaft is not coupled to the drive shaft.

In the tablet cassette according to the present invention, the sliding shaft is introduced in place of a swing member or a swing motion support point, and the sliding shaft is moved in the axial direction in the rotary shaft in accordance with the balance between the weight of the sliding shaft itself and pushing by the drive shaft which is inserted when the cassette is mounted. This eliminates the need for the swing member, the swing motion support shaft, or a slit for passage of the swing member, such as those described in Patent Document 5 which are small and delicate, and inhibits rotation of the rotor when the tablet cassette is not mounted by using larger and simpler members than the members described in the Patent Document 5. Thus, with the present invention, the manufacture cost is suppressed.

Preferably, the rotor body includes an additional member containing space therein, the additional member containing space being configured to open toward the bottom wall portion; and the plurality of engaged portions, the two or more engaging portions, a part of the rotary shaft, and a part of the sliding shaft are located in the additional member containing space. Preferably, one end of the rotary shaft is fixed to the rotor body via a fitting structure; and a pair of slits are formed at positions facing each other in a radial direction in a portion of the one end of the rotary shaft that is exposed in the additional member containing space. The two or more engaging portions may be composed of a pair of engaging portions provided at a pair of arm portions provided on the sliding shaft to extend out through the pair of slits. With this configuration, the pair of arm portions which project from the slits are moved while being guided in the pair of slits to allow the pair of engaging portions to be reliably engaged with some of the plurality of engaged portions.

The tablet cassette may further include a displacement allowing mechanism configured to allow the rotary shaft to be displaced in the axial direction in a limited range. In this case, at least one cam portion configured to project toward the additional member containing space is provided in an outer annular inner surface region of the bottom wall portion on a radially outer side of the annular inner surface region; and a follower is fixed to the rotary shaft or an inner wall portion of the rotor body, the follower including a sliding portion configured to slide on a cam surface of the cam portion along with rotation of the rotary shaft. The cam surface is shaped to displace the rotary shaft in the axial direction along with movement of the follower. With this configuration, the rotary shaft is moved in the vertical direction when the follower is moved along the cam surface along with rotation of the rotary shaft. As a result, tablets located on the rotor body are caused to fall down by the vertical movement, suppressing formation of agglomerated tablets on the rotor body. With the tablet cassette according to the invention, in addition, the cam portion is disposed on the outer side of the plurality of engaged portions, and thus the cam portion and the follower can be mounted without impairing the function of the means for inhibiting rotation of the rotor when the tablet cassette is not mounted. When the rotor is rotationally driven, the rotor is occasionally thrust up, along with discharge of the tablets, by intermittent interference between the cam portion and the sliding portion of the follower. Therefore, tablets located on the rotor in the tablet container also receive a slight impact, and thus a cluster of tablets that have halfway been solidified are immediately disentangled. As a result, tablets located on partition walls located at the outer peripheral portion of the rotor in the tablet container are also allowed to easily move. When the tablets are carried to the partition member, the tablets immediately escape even if they are almost caught between the partition walls and the partition member. Therefore, the frequency of the occurrence of an undesired event that the tablets are stuck there is significantly reduced.

Preferably, the cam surface includes a gentle upward surface and a steep downward surface. With such the cam surface, an advantage that the sliding portion falls down along the steep downward surface with a large impact can be obtained.

Preferably, the follower includes at least one pair of sliding portions configured to face each other in a radial direction of the rotary shaft; and the at least one cam portion includes at least one pair of cam portions configured to face each other in the radial direction of the rotary shaft. With this configuration, the rotor is not unnecessarily tilted, and thus the rotor can be smoothly rotated.

If the follower is externally mounted to the rotary shaft, the sliding portions are held at necessary positions by a portion configured to project radially outward from the rotary shaft. Therefore, a follower that is easily attachable and that imposes little constraint on the shape of the rotor body or the like can be achieved.

If a plurality of partition walls are formed at an outer peripheral portion of the rotor body to define the plurality of tablet receiving portions, and a partition member is mounted to the tablet container so as to project into the tablet containing space to form a predetermined gap between an upper end of each of the partition walls and the partition member, a maximum projecting dimension of the cam portion is preferably larger than a dimension of the gap between the partition member and the upper end of each of the partition walls in a height direction. With this configuration, the partition member is hit from below by the rotor when the rotor is thrust up as the sliding portion slides on the cam portion. Thus, the partition member is also occasionally slightly thrust up when the tablets are discharged. Therefore, an advantage that tablets located on the partition member in the tablet container are swung and moved away from the partition member to fall down is obtained.

The plurality of engaged portions may be integrally provided on an annular base fixed to the bottom wall portion. As a matter of course, the plurality of engaged portions may be directly integrally formed on the bottom wall portion. In addition, the at least one cam portion may also be integrally provided on the base. With this configuration, the number of components can be reduced to facilitate assembly.

If the rotor body includes a cylindrical portion configured to project into the additional member containing space, and one end of the rotary shaft is fitted with the cylindrical portion, the cylindrical portion preferably includes an energy storing member therein, the energy storing member being configured to store energy when the rotary shaft is coupled to the drive shaft, and to release the energy to engage the two or more engaging portions with the plurality of engaged portions by pushing the sliding shaft when the rotary shaft is not coupled to the drive shaft. With this configuration, the sliding shaft can be adequately lowered.

Further, the displacement allowing mechanism which allows displacement of the rotary shaft in the axial direction may include a washer provided at the other end of the rotary shaft which penetrates the bottom wall portion, and an energy storing member disposed between the washer and an outer surface of the bottom wall portion to store energy. When such a displacement allowing mechanism is provided, the energy storing member of the displacement allowing mechanism can be easily mounted, removed, and retrofitted by disposing the displacement allowing mechanism on the lower side of the bottom wall portion of the tablet container.

The rotor body may include a cylindrical portion configured to project into the additional member containing space; and the rotary shaft may include a fitted portion to be fitted with the cylindrical portion, and a large diameter portion configured to be continuous with the fitted portion to extend in the additional member containing space. When the tablet cassette with such a configuration is assembled again with the follower removed, the amount by which the fitted portion at the upper end of the rotary shaft is fitted in the cylindrical portion is not stable, and the entire length of the fitted portion is inserted into the cylindrical portion in not a small number of cases. If the amount by which the fitted portion is fitted is increased in this manner, the lowered position of the sliding shaft which slides in the rotary shaft may be raised, and the engaging portions may not reach the engaged members. Further, with the upper end of the fitted portion of the rotary shaft, which is fitted in the cylindrical portion, reaching a farther position, the slits of the rotary shaft may be undesirably deformed to be narrowed with a bending force applied to the distal end of the fitted portion of the rotary shaft.

Thus, excessive fitting inhibiting means is preferably provided to avoid full abutment between the cylindrical portion and the large diameter portion of the rotary shaft by securing a predetermined distance between an end surface of the cylindrical portion and an end surface of the large diameter portion that faces the cylindrical portion when the fitted portion is fitted with the cylindrical portion. By providing the excessive fitting inhibiting means, full abutment between the cylindrical portion of the rotor and the large diameter portion of the rotary shaft is avoided by securing a distance between the end surface of the cylindrical portion and the end surface of the large diameter portion when the fitted portion of the rotary shaft is fitted in the cylindrical portion of the rotor. Thus, by externally mounting the follower to the rotary shaft with a part of the follower interposed in the gap between the facing non-sliding portions of the two end surfaces, the follower can be additionally mounted, the added follower can be replaced, and the added follower can be removed without significantly varying the state of fitting between the cylindrical portion of the rotor and the fitted portion of the rotary shaft.

Preferably, a length of a portion of the cylindrical portion to be fitted with the fitted portion of the rotary shaft is shorter than a length of the fitted portion in the axial direction; and an annular gap is formed between the end surface of the cylindrical portion and the end surface of the large diameter portion that faces the cylindrical portion. This annular gap is formed by the excessive fitting inhibiting means.

A ring plate-like member may be received in the annular gap, away from the follower. Desired excessive fitting inhibiting means can be implemented by externally mounting the ring plate-like member to the rotary shaft in place of the follower when the follower is not mounted, and conveniently adopting a member that is as thick as the follower but that does not interfere with the cam portion as the ring plate-like member.

A projecting portion may be formed on a part of one or both of an end surface of the cylindrical portion and an end surface of the large diameter portion of the rotary shaft, and a distance between the end surface of the cylindrical portion and the end surface of the large diameter portion may be secured with the projecting portion and a portion facing the projecting portion abutting against each other when the cylindrical portion and the fitted portion are fitted with each other. Also with this configuration, desired excessive fitting inhibiting means can be implemented.

BRIEF DESCRIPTION OF DRAWINGS

FIG. 98 is a vertical sectional view of a tablet container.

DESCRIPTION OF EMBODIMENTS

Figure 1A:
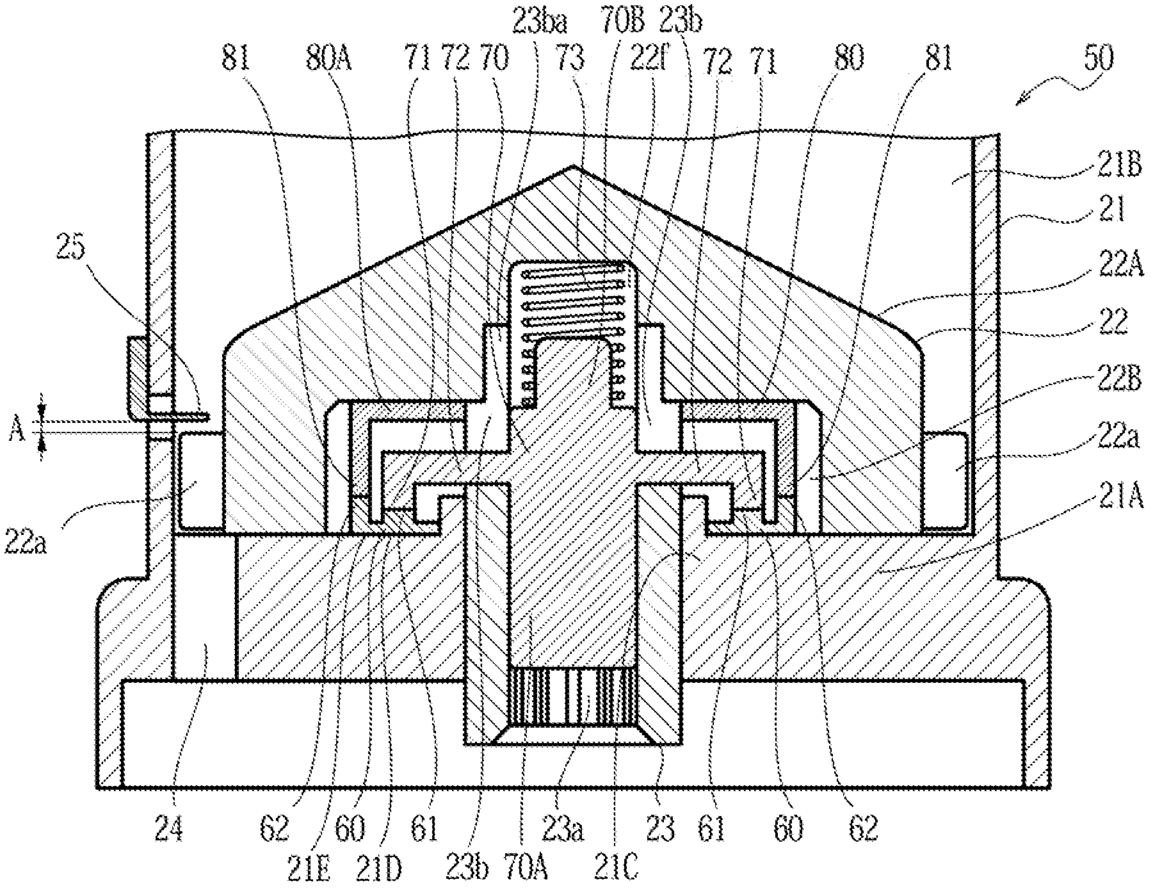
FIG. 1A is a vertical sectional view of a tablet cassette according to a first embodiment of the present invention in a free state.

A tablet cassette according to embodiments of the present invention will be described in detail with reference to the drawings.

First Embodiment

FIGS. 1 to 4 are drawings to illustrate a first embodiment. In the drawings, constituent elements that are similar to those of the tablet cassette according to the conventional illustrated in FIG. 19 are given the same reference numerals. Since the description of such constituent elements made in the Background Art section is common to the following embodiments, redundant description is not made again, and differences from the related art will be mainly described below.

Figure 1B:
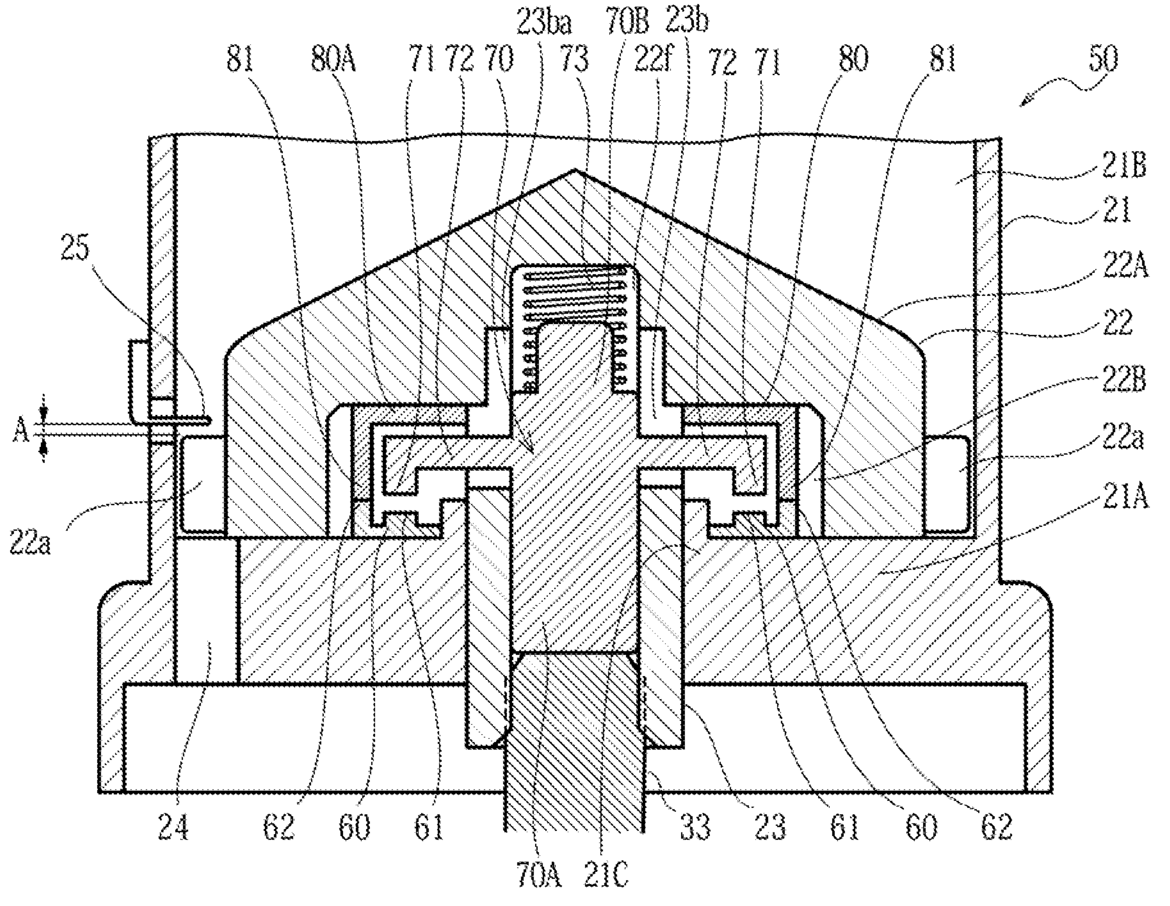
FIG. 1B is a vertical sectional view of the tablet cassette to which a drive shaft is coupled.

FIGS. 1A and 1B are each a vertical sectional view of a tablet cassette 50. FIG. 1A is a vertical sectional view of the tablet cassette 50 in a free state to which a drive shaft is not coupled. FIG. 1B is a vertical sectional view of the tablet cassette 50 in amounted state in which a drive shaft 33 is fitted in a rotary shaft 23.

Figure 2A:
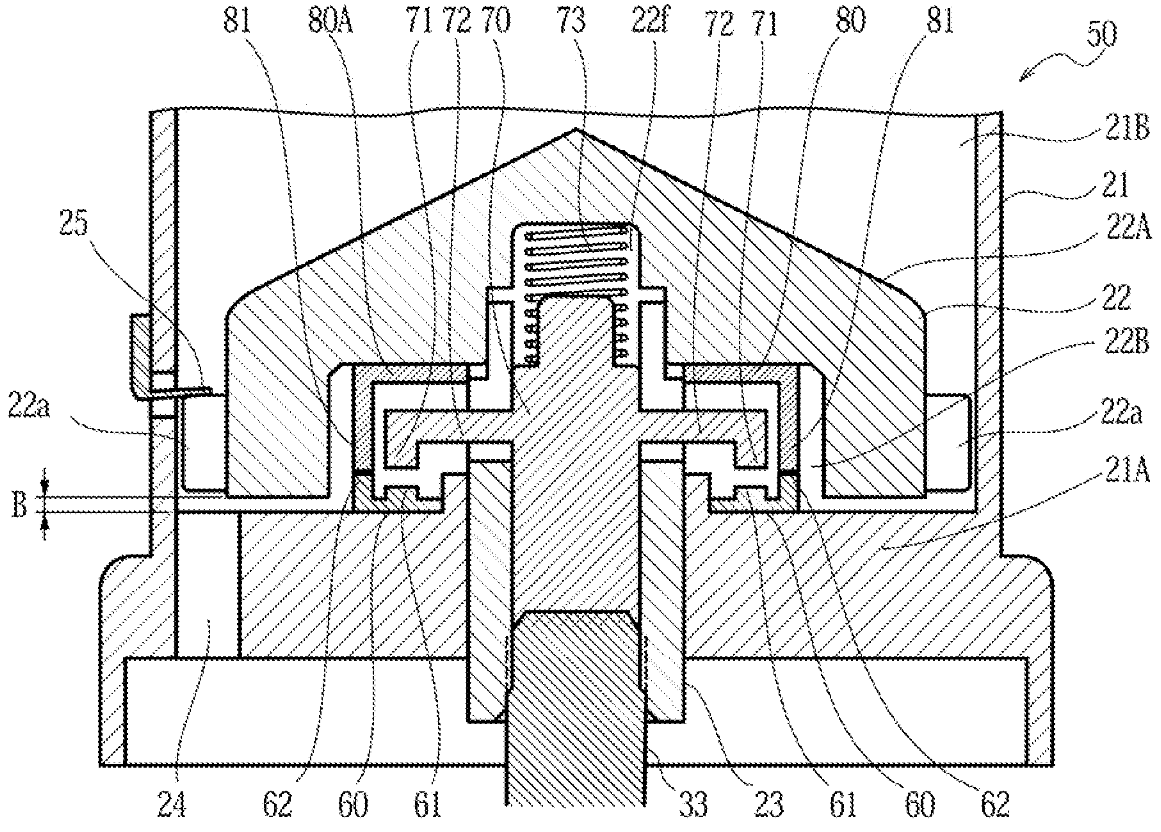
FIG. 2A is a vertical sectional view of the tablet cassette in a thrust state.
Figure 2B:
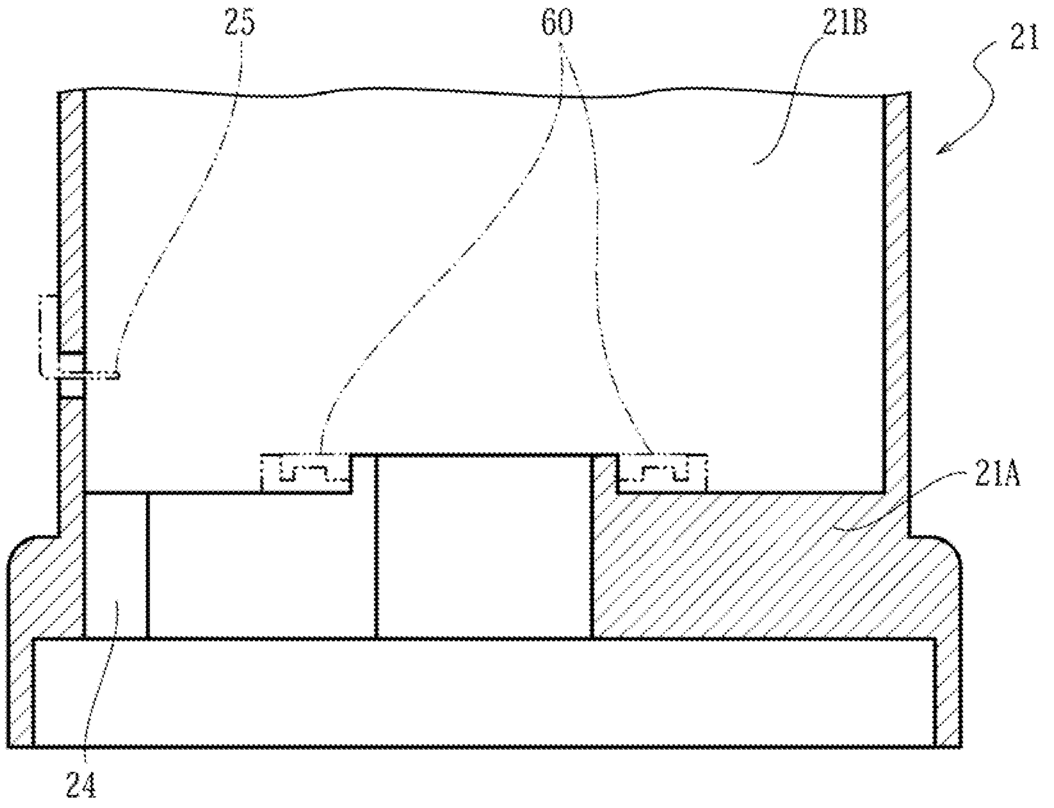
FIG. 2B is a vertical sectional view of an essential portion of a tablet container.

In addition, FIG. 2A is a vertical sectional view of the tablet cassette 50 in a state in which sliding portions 81 ride on cam portions 62 to be discussed later, and FIG. 2B is a vertical sectional view of an essential portion of a tablet container 21.

Figure 3A:
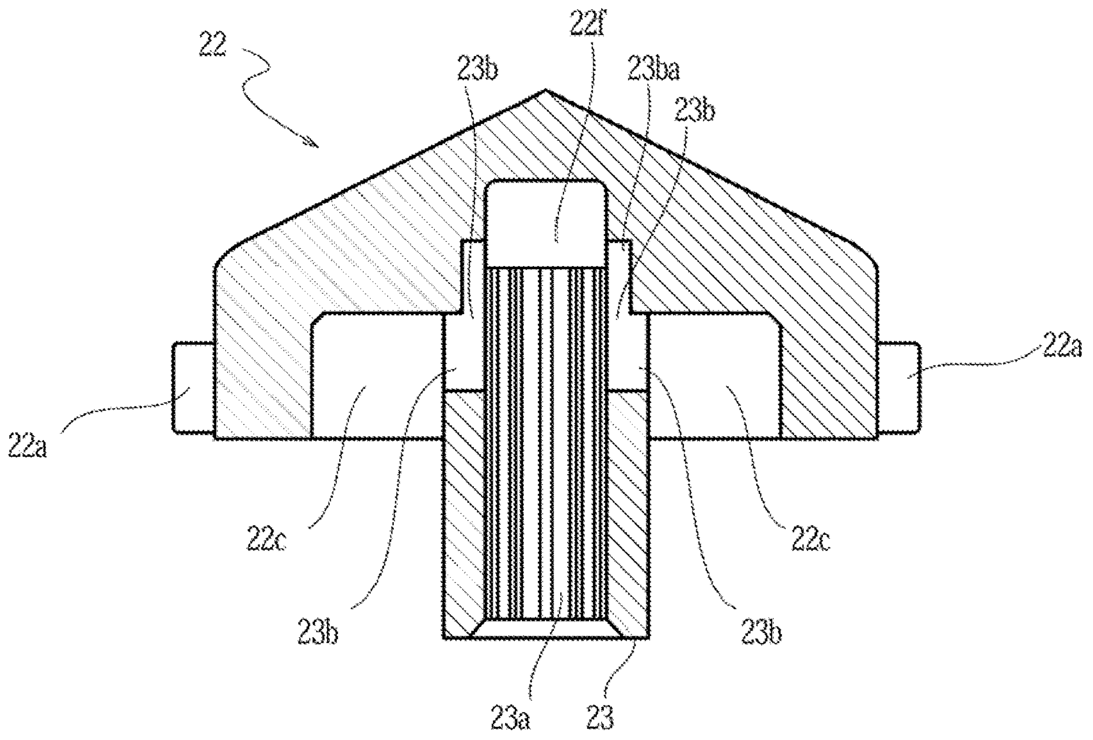
FIGS. 3A and 3B are each a vertical sectional view of a rotor.
Figure 3B:
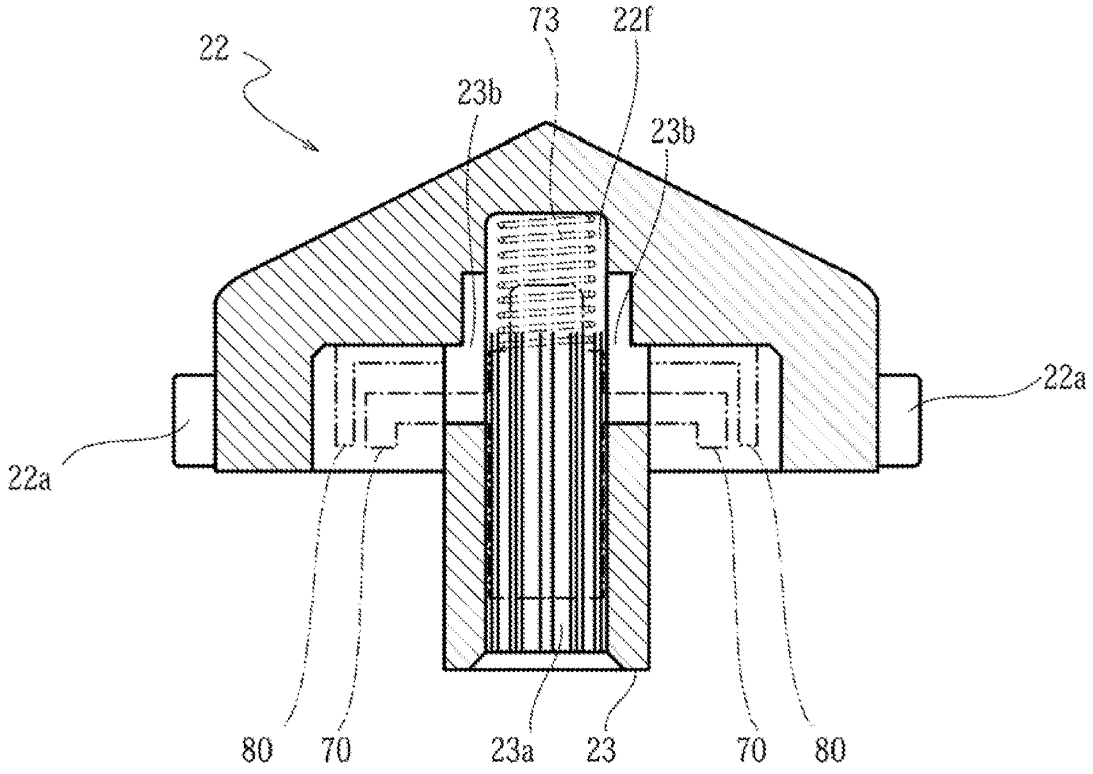
Figure 4A:
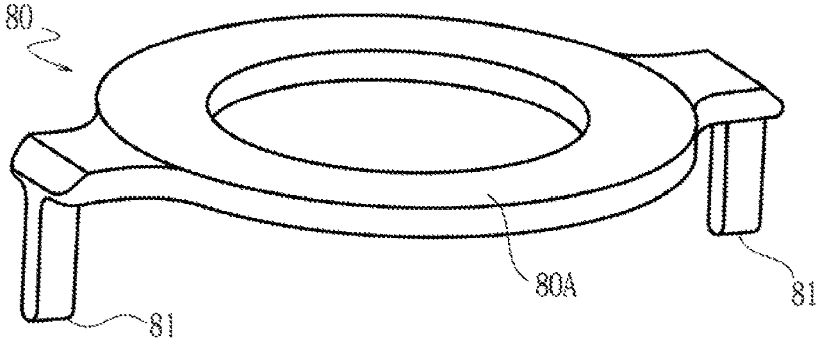
FIG. 4A is a perspective view of a follower.
Figure 4B:
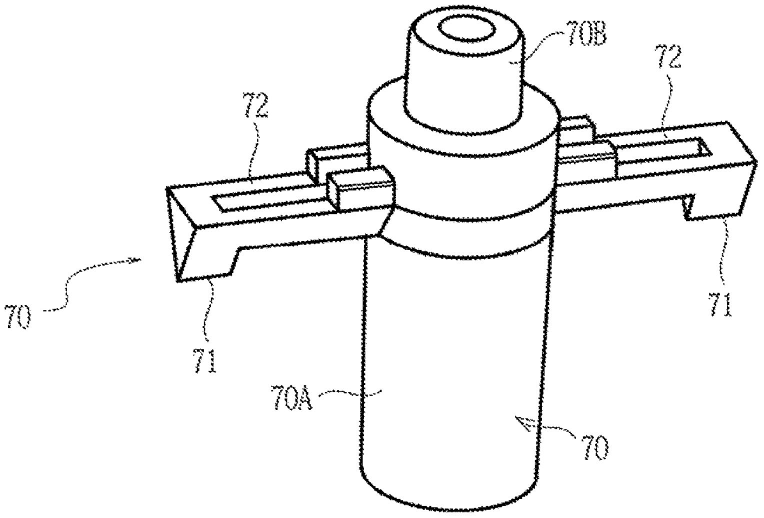
FIG. 4B is a perspective view of a sliding shaft.

Further, FIGS. 3A and 3B are each a vertical sectional view of a rotor 22. FIG. 4A is a perspective view of a follower 80. FIG. 4B is a perspective view of a sliding shaft 70, and FIG. 4C is a perspective view of the engaged member 60.

The tablet cassette 50 includes a tablet container 21 discussed already and a partition member 25, a rotor 22 and a rotary shaft 23 that have been partially modified, and an engaged member 60, a sliding shaft 70, and a follower 80 as new components. The tablet cassette 50 according to the present embodiment includes a structure for inhibiting rotation of the rotor 22 when the tablet cassette 50 is not mounted, and a structure for preventing tablets from remaining on the rotor 22. In addition, the tablet cassette 50 according to the present embodiment adopts the partition member 25 which is used in the existing tablet cassette 20. In the tablet cassette 50 according to the present embodiment, the tablet container 21 includes a tablet containing space 21B therein for containing a plurality of tablets in a random m23anner, and a bottom wall portion 21A having a discharge port 24 to allow the plurality of tablets in the tablet containing space 21B to fall down one by one. The engaged member 60 is provided on the bottom wall portion 21A. In addition, a sliding shaft 70 and a coil spring 73 are added after a coupling portion between a rotor body 22*a* of the rotor 22 and the rotary shaft 23 is partially modified.

The rotor body 22*a* [see FIGS. 1, 2A, and 3] of the rotor 22 includes an additional member containing space 22*b* therein, and the additional member containing space 22*b* is configured to open toward the bottom wall portion 21A. The engaged member 60 which includes a plurality of engaged portions to be discussed later, a pair of arm portions 72 including two or more engaging portions 71 and integrally formed on the sliding portion 70, two cam portions 62*a* follower 80 including two sliding portions 81 a part of the rotary shaft 23 and a part of the sliding shaft 70 are located in the additional member containing space 22*b*. In addition, the additional member containing space 22*b* also includes an internal space of a bottomed hole 22*f* formed at the center portion of the inner wall portion of the rotor body 22*a*. In the present embodiment, the bottomed hole 22*f* constitutes a part of a tubular portion which has a large diameter portion and a small diameter portion and with which a small diameter portion 23*ba* at one end of the rotary shaft 23 is tightly fitted. The rotary shaft 23 is integrated with the rotor body 22*a* with the small diameter portion 23*ba* of the rotary shaft 23 tightly fitted in the large diameter portion of the bottomed hole 22*f*. The rotary shaft 23 is coupled to the rotor 22 only at the peripheral portion of the bottomed hole 22*f*. One end of the coil spring 73 As an energy storing member is fitted in the small diameter portion of the bottomed hole 22*f*. The other end of the coil spring 73 is fitted in a through hole 23*a* of the rotary shaft 23*a* small diameter portion 70B provided at the upper end of a shaft portion 70A of the sliding shaft 70 is fitted with the other end of the coil spring 73. The coil spring 73As an energy storing member stores energy applied by the sliding shaft 70 when the drive shaft 33 is coupled to the rotary shaft 23 and releases the energy by pushing the sliding shaft 70 so that the two or more engaging portions 71 are engaged with the plurality of engaged portions 61 when the rotary shaft 23 is not coupled to the drive shaft 33.

Figure 4C:
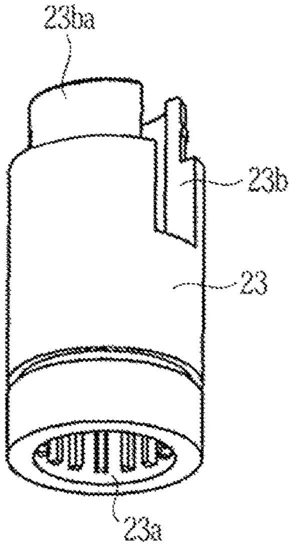
FIG. 4C is a perspective view of a rotary shaft.

The rotary shaft 23 [see FIGS. 1, 2A, 3 and 4C] is hollow, and has the through hole 23*a*. A portion to be fitted and meshed with the drive shaft 33 is formed in the lower end portion of the through hole 23*a* of the rotary shaft 23. In addition, the sliding shaft 70 is received in the rotary shaft 23 to be slidable in the axial direction. Further, as illustrated in FIG. 4C, two slits 23*b* that oppose each other in the radial direction are formed in the rotary shaft 23. The two slits 23*b* extend from the middle to one end of the rotary shaft 23. The pair of arm portions 72 which are integrally provided on the shaft portion 70A of the sliding shaft 70 are movably fitted with the slits 23*b*.

Figure 4D:
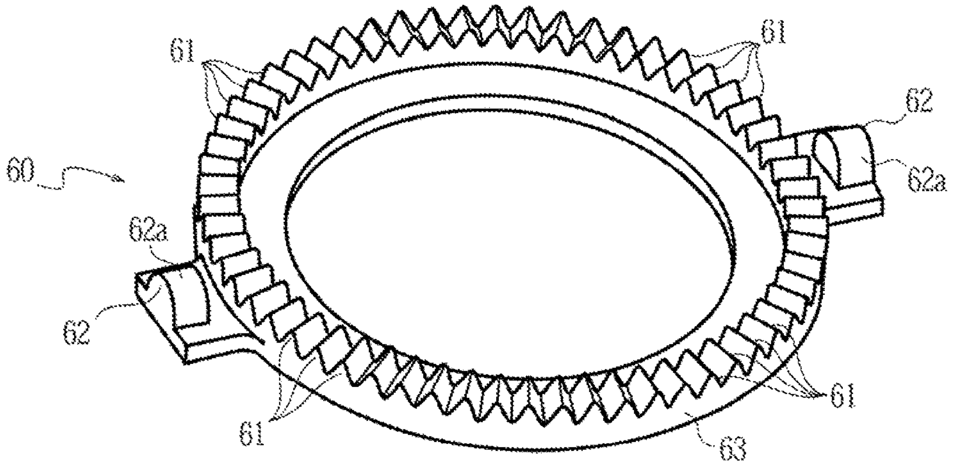
FIG. 4D is a perspective view of an engaged member.

The engaged member 60 [see FIGS. 1, 2A and 4D] is a generally ring-shaped member, and is structured such that the plurality of engaged portions 61 are integrally formed over the entire circumference of the upper surface of a ring-shaped base 63. The plurality of engaged portions 61 are disposed side by side such that triangular projecting portions are continuously located at equal intervals on the base 63. When seen differently, the plurality of engaged portions 61 can be expressed, as disposed side by side such that inverted triangular recessed portions are continuously located at equal intervals on the base 63, or such that triangular projecting portions and, inverted triangular recessed portions are alternately and continuously located at equal intervals on the base 63. Thus, the plurality of engaged portions 61 may be constituted from at least either projecting portions or recessed portions. The engaged member 60 is fixed by bonding, fusing, or the like on an annular inner surface region 21D around the upper edge of an insertion hole 21C, for the rotary shaft 23 of the rotor 22, in the inner bottom surface of the bottom wall portion 21A of the tablet container 21. The plurality of engaged portions may be provided at predetermined intervals in the circumferential direction on the annular inner surface region 21D of the bottom wall portion 21A at a predetermined distance away from the rotary shaft 23.

In the present embodiment, moreover, a plurality of cam portions 62 configured to project into the additional member containing space 22*b* are provided in an outer annular inner surface region 21E of the bottom wall portion 21A on the radially outer side of the annular inner surface region 21D. Specifically, in the present embodiment, the cam portions 62 are integrally formed on the engaged member 60. In the present embodiment, two cam portions 62 are mounted to the inner bottom surface 21A of the tablet container 21 together with the engaged member 60 as integrally formed objects. The follower 80 is fixed to the inner wall portion of the rotor body 22*a*. The follower 80 includes sliding portions 81 configured to slide on cam surfaces 62*a* of the cam portions 62 along with rotation of the rotary shaft 23. The cam surfaces 62*a* are shaped to displace the rotary shaft 23 in the axial direction along with movement of the follower 80. In the present embodiment, in addition, at least a pair of cam portions 62 and at least a pair of sliding portions 81 are provided to opposite each other in the radial direction of the rotary shaft 23. The cam surfaces 62*a* according to the present embodiment are shaped to have a semi-circular cross section. With this configuration, the rotary shaft 23 is moved in the vertical direction when the sliding portions 81 of the follower 80 are moved along the cam surfaces along with rotation of the rotary shaft 23. As a result, tablets located on the rotor body 22*a* are caused to fall down by the vertical movement, suppressing formation of agglomerated tablets on the rotor body 22*a*.

The sliding shaft 70 [see FIGS. 1, 2A, and 4B] is composed of the shaft portion 70A which is disposed in the through hole 23*a* of the rotary shaft 23 to be movable in the axial direction, the pair of arm portions 72 which oppose each other in the radial direction and which extend radially outward, and the pair of engaging portions 71 which are provided at the distal ends of the pair of arm portions 72. The sliding shaft 70 is disposed in the through hole 23*a* of the rotary shaft 23 to rotate together with the rotary shaft 23 and such that the shaft portion 70A is slidable in the axial direction to be displaced toward the rotor body 22*a* when the rotary shaft 23 is coupled to the drive shaft 33 and displaced toward the bottom wall portion 21C when the rotary shaft 23 is not coupled to the drive shaft 33. The pair of arm portions 72 penetrate the pair of slits 23*b*, which are provided in the rotary shaft 23, to extend radially outward, and relatively move in the slits 23*b* only in the axial direction with respect to the rotary shaft 23. While the length of the slits 23*b* is larger than the thickness of the arm portions 72 by a distinct difference in the axial direction of the rotary shaft 23, the width of the slits 23*b* is larger than the width of the arm portions 72 by only a slight difference. Therefore, the sliding shaft 70 is vertically movable in a limited range with respect to the rotary shaft 23, but is hardly movable relative thereto in the radial direction.

The engaging portions 71 (see FIGS. 1 to 4), which are provided at the distal ends of the pair of arm portions 72, correspond to the engaged portions 61 discussed above, and the lower ends of the engaging portions 71 are shaped to be slightly fitted with the recessed portions of the engaged portions 61. When the sliding shaft 70 is biased downward by its own weight or the coil spring 73, the engaging portions 71 are lowered onto the plurality of engaged portions 61 to abut against the engaged portions 61 at the corresponding locations and be further fitted into the closest recessed portions [see FIG. 1A]. When the drive shaft 33 is coupled to the rotary shaft 23 [see FIGS. 1B and 2A], moreover, the sliding shaft 70 is pushed up by the drive shaft 33 to be moved upward in the axial direction of the rotary shaft 23, which disengages the engaging portions 71 from the engaged portions 61 of the engaged member 60.

The follower 80 [see FIGS. 1, 2A, and 4A] includes a circular ring portion 80A, the inside diameter of which is larger than the outside diameter of the rotary shaft 23 and two sliding portions 81 configured to extend in a direction (vertically downward in the mounted state) parallel to the center line of the ring (a virtual line that penetrates the ring) from the outer end portions of the circular ring portion 80A The circular ring portion 80A is fixed to the downwardly facing ceiling surface of the additional member containing space 22*b* of the rotor 22 by bonding or the like while surrounding the rotary shaft 23. The sliding portions 81 project downward from the ceiling surface. When the rotor 22 is rotated in the tablet container 21, the sliding portions 81 slide on the cam surfaces 62*a* of the cam portions 62.

An amount B [see FIG. 2A] by which the sliding portions 81 are displaced in the vertical direction when the sliding portions 81 slide on the cam surfaces 62*a* of the cam portions 62 corresponds to the distance by which the rotor 22 is raised from the inner bottom of the tablet container 21. The amount B is slightly larger than a difference A (see FIG. 1) in height between the partition member 25 and the partition walls 22*a*. In other words, the maximum projection dimension of the cam portions 62*a* is larger than the dimension in the height direction of the gap between the partition member 25 and the upper end of each of the partition wall 22*a*.

The mode of use and operation of the tablet cassette 50 according to the first embodiment will be described with reference to FIGS. 1A, 1B, and 2A discussed above.

When the tablet cassette 50 is removed from the drive portion 30 [see FIG. 1A], the drive shaft 33 is extracted from the rotary shaft 23. Thus, the sliding shaft 70 which has been released from pushing by the drive shaft 33 is pushed downward by the coil spring 73 located above the sliding shaft 70, in addition to its own weight, to be lowered. Accordingly, the engaging portions 71 are lowered toward the engaged member 60. Thus, the engaging portions 71 are slightly fitted into recessed portions of the plurality of engaged portions 61 directly below the engaging portions 71. This engaging action inhibits rotation of the rotary shaft 23 as a result, rotation of the rotor 22 is suppressed during normal handling such as transport of the tablet cassette 50, mounting/removal of the tablet cassette 50 to/from the drive portion 30, and replenishment of the tablet cassette 50 with tablets. Thus, an undesired fall of tablets is adequately prevented.

When the tablet cassette 50 is attached to the drive portion 30 [see FIG. 1B], meanwhile, the drive shaft 33 is fitted into the rotary shaft 23 so that the two shafts are meshed with each other, and the sliding shaft 70 is pushed up by the drive shaft 33 to be raised against the weight of the sliding shaft 70 itself and the biasing force of the coil spring 73. Along with the rise of the sliding shaft 70, the engaging portions 71 are raised to be disengaged from the engaged portions 61 of the engaged member 60. Thus, the drive shaft 33 adequately drives rotation of the rotary shaft 23 and hence rotation of the rotor 22. Therefore, each time the drive shaft 33 is rotated, the rotor 22 is also rotated. This feeds the partition walls 22*a* and hence the tablet containing spaces 22*b* forward to allow the tablets, which have been carried to a location below the partition member 25 in the tablet containing space 22*b*, to fall down one by one through the discharge path 24.

When the rotor 22 is rotated as described above, further, the follower 80 which is mounted thereto is also rotated. Accordingly, the sliding portions 81 make circular movement. In the present embodiment, the sliding portions 81 abut against the cam portions 62 each time the follower 80 makes a half rotation.

Then [see FIG. 2A], the sliding portions 81 ride on the cam surfaces of the cam portions 62 to be raised by the amount B. Thus, the rotor 22 to which the follower 80 is mounted is also raised by the amount B.

Therefore, the tablets which have been located on the rotor 22 are vertically swung in the tablet container 21. Thus, even if a large number of tablets have been agglomerated, such tablets are disentangled immediately.

In addition, the partition walls 22*a* are also vertically moved by the amount B along with vertical movement of the rotor 22. Thus, the upper end of each of the partition wall 22*a* which is located below the partition member 25 abuts the partition member 25 while lightly hitting the lower surface of the partition member 25. Thus, the tablets which have been on the partition member 25 are swung to immediately fall down from the partition member 25.

[Others]

The cam portions 62 according to the embodiment described above and illustrated in FIG. 4D have a semi-circular cross section, and pass the sliding portions 81 while pushing up the sliding portions 81 whether the sliding portions 81 rotate clockwise or counterclockwise. If the moving direction of the sliding portions 81 is limited to one direction, however, slopes to be contacted by the sliding portions 81 may be formed on only one side, such as in a sawtooth shape.

In the embodiment described above, the plurality of cam portions 62 are provided at opposite positions to smoothly move the follower 80 and hence the rotor 22 vertically and not to generate a force to tilt the rotary shaft 23 and so forth, in order not to damage the members. If there is no problem with smooth operation of the members or damage to the members, however, the cam portions 62 may be provided at any position, rather than the radially opposite positions.

Second Embodiment

A tablet cassette according to a second embodiment of the present invention will be described with reference to FIGS. 5 to 8. In FIGS. 5 to 8, the same components as those according to the first embodiment illustrated in FIGS. 1 to 4 are denoted by the same reference numerals as the reference numerals affixed to their counterparts in FIGS. 1 to 4.

Figure 5A:
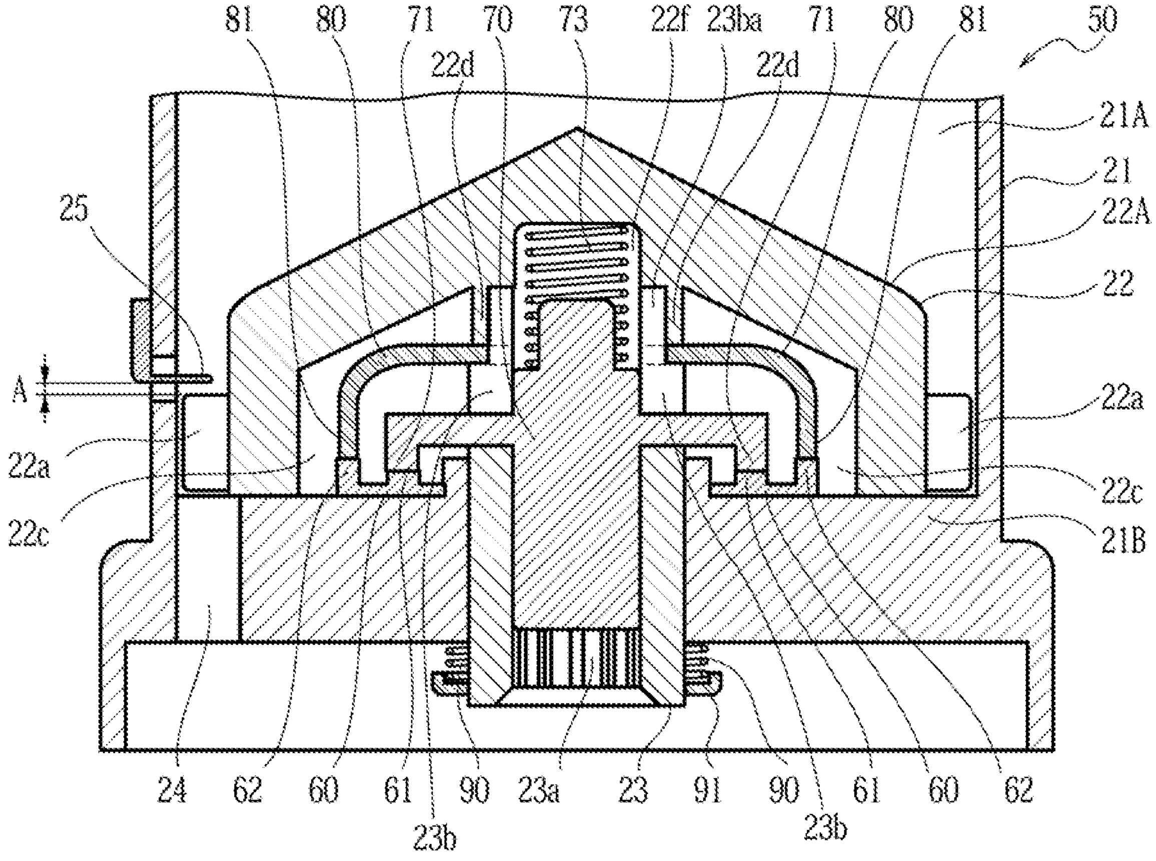
FIG. 5A is a vertical sectional view of a tablet cassette according to a second embodiment of the present invention in a free state.
Figure 5B:
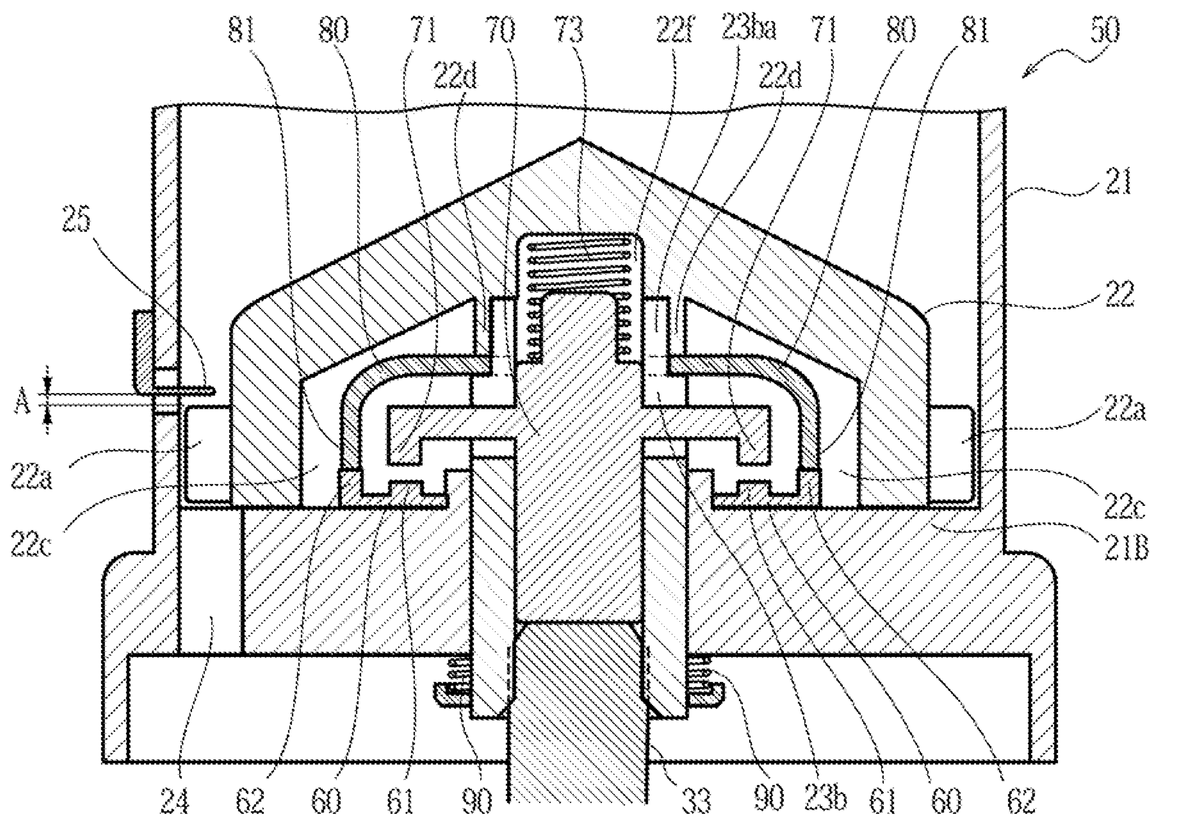
FIG. 5B is a vertical sectional view of the tablet cassette in the state of being mounted to a drive shaft.
Figure 6:
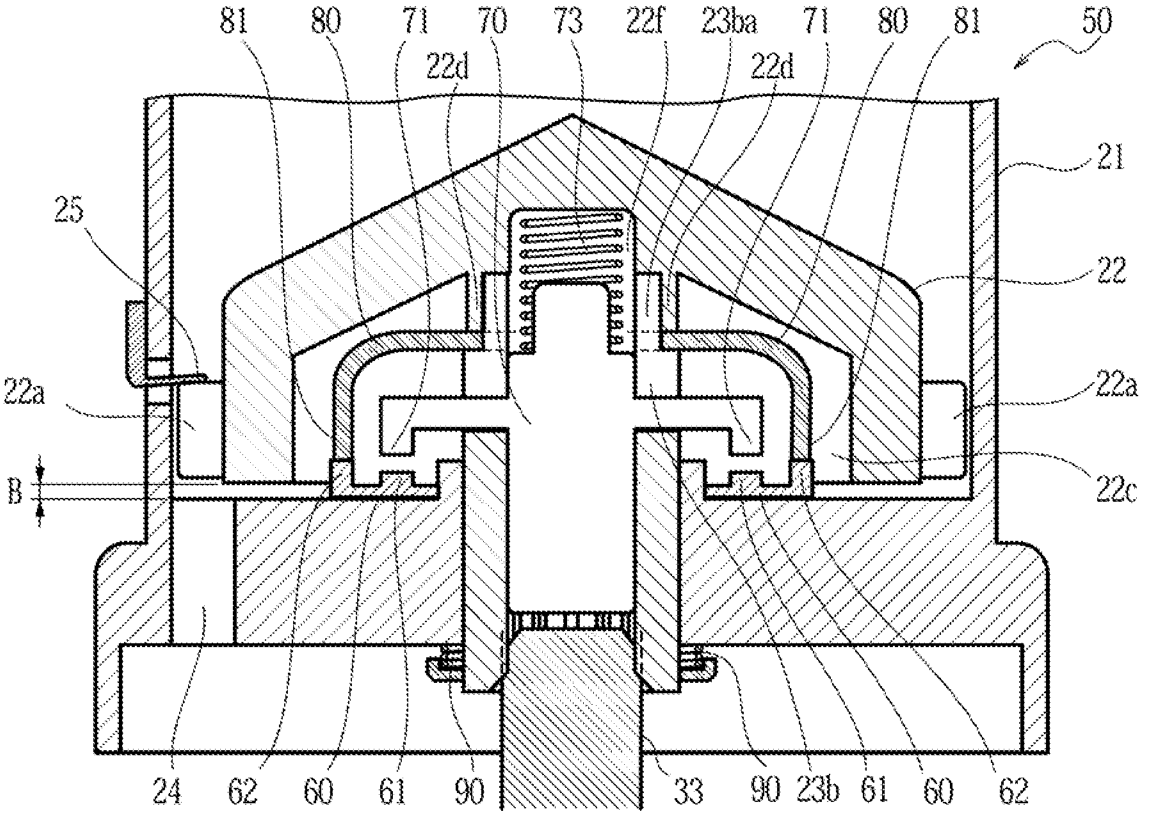
FIG. 6 is a vertical sectional view of the tablet cassette according to the second embodiment in a thrust state.
Figure 7A:
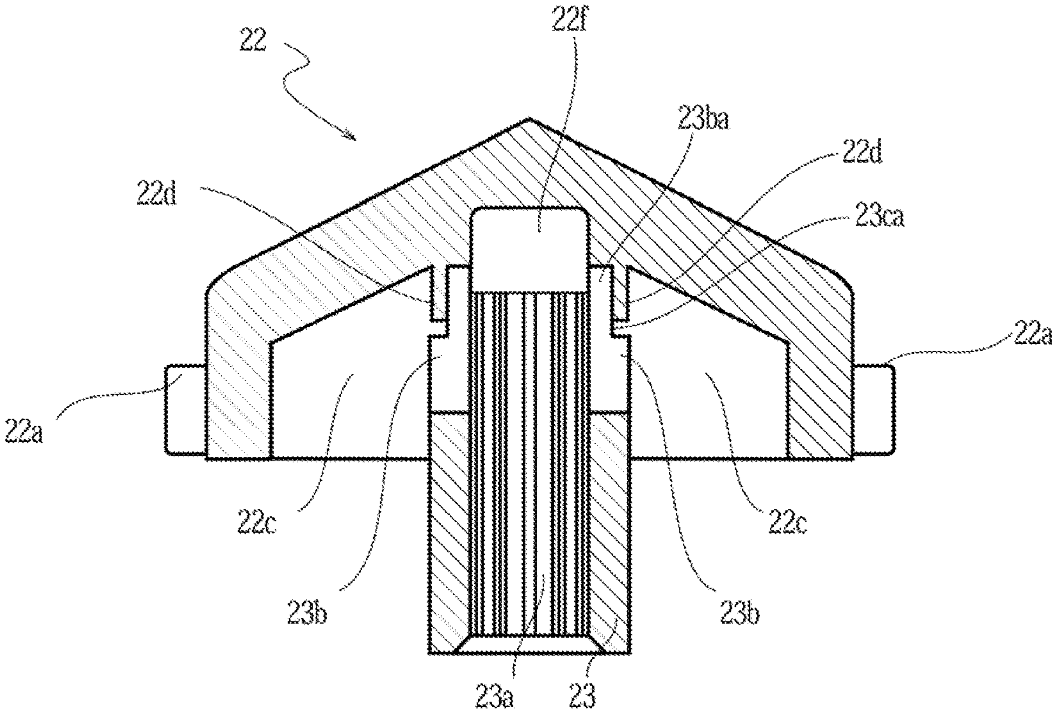
FIGS. 7A and 7B are each a vertical sectional view of a rotor with a rotary shaft in which the rotary shaft is attached to the rotor.
Figure 7B:
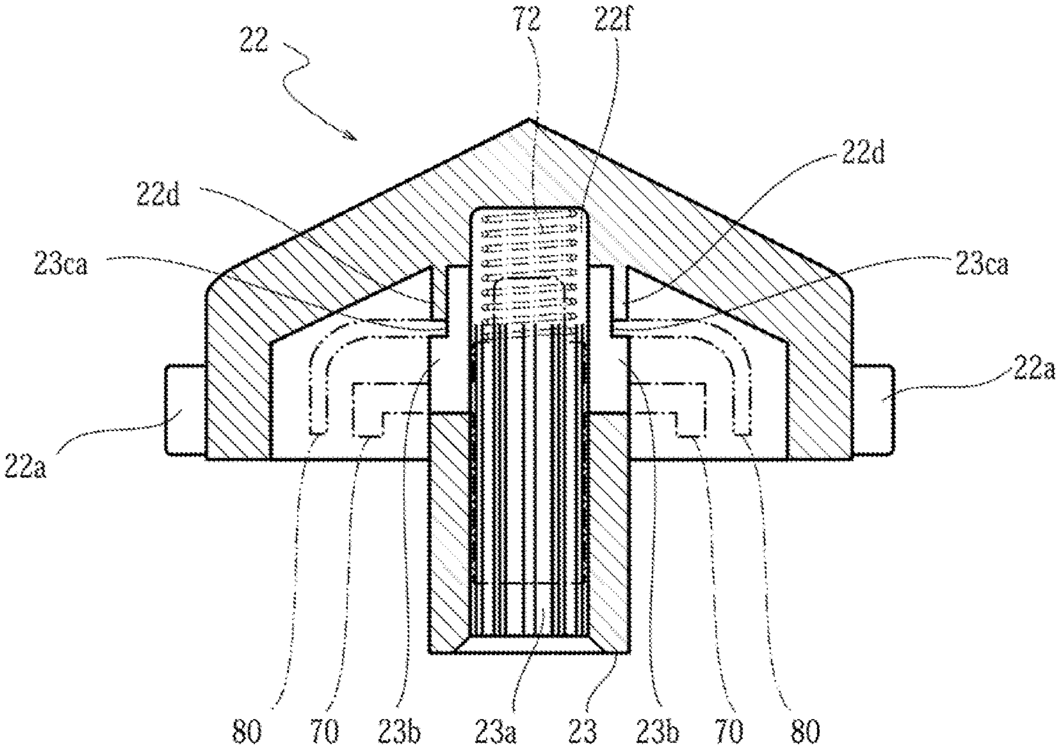
Figure 8A:
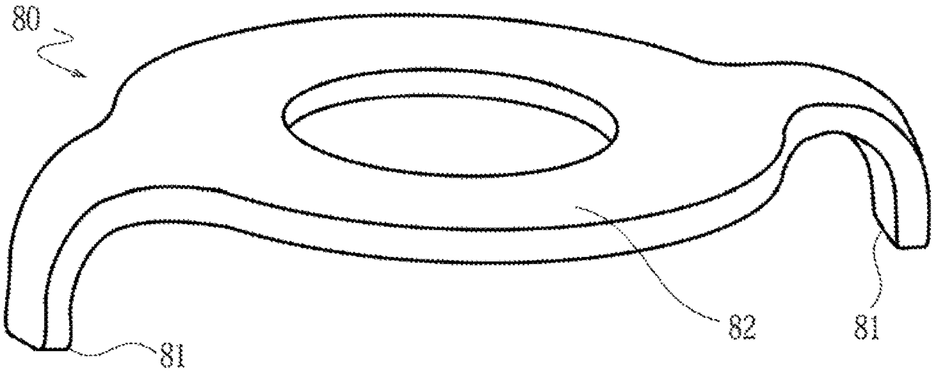
FIG. 8A is a perspective view of a follower.
Figure 8B:
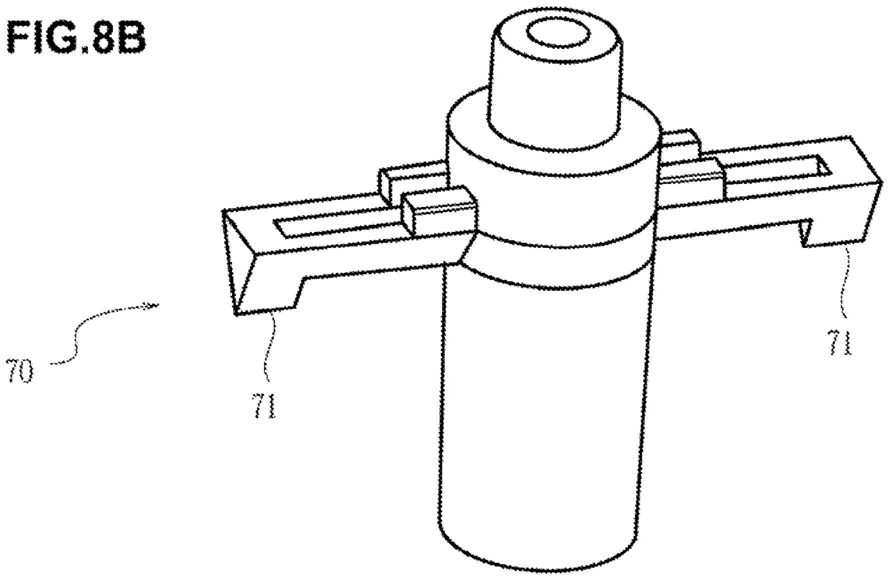
FIG. 8B is a perspective view of a sliding shaft.
Figure 8C:
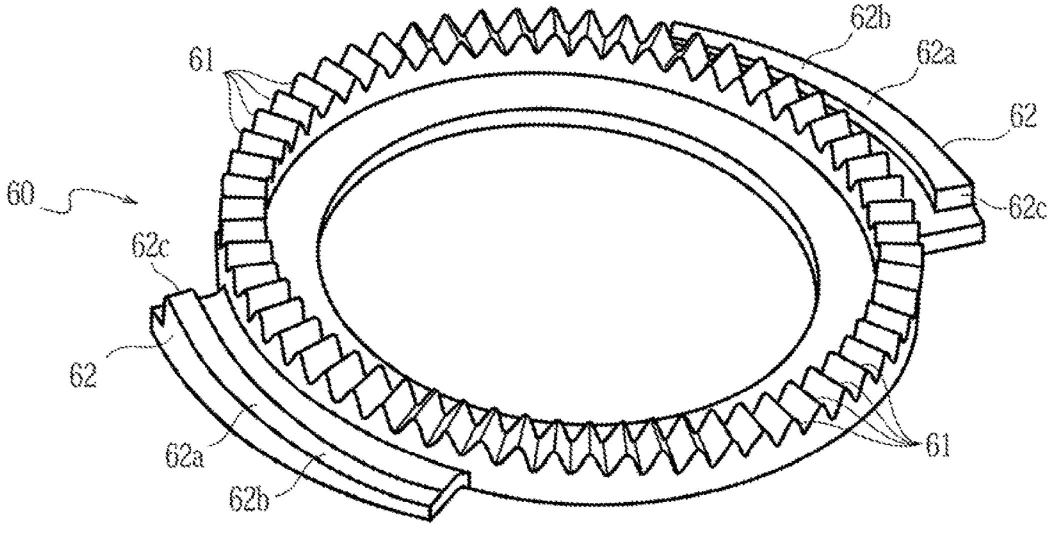
FIG. 8C is a perspective view of an engaged member.

A specific configuration of the tablet cassette according to the second embodiment of the present invention will be described with reference to the drawings. FIGS. 5A and 5B are each a vertical sectional view of the tablet cassette 50. FIG. 5A is a vertical sectional view of the tablet cassette 50 in a free state. FIG. 5B is a vertical sectional view of the tablet cassette 50 in a mounted state in which the drive shaft 33 is fitted in the rotary shaft 23. In addition, FIG. 6 is a vertical sectional view of the tablet cassette 50 in a thrust state in which abutment portions 81 ride on the cam portions 62. Further, FIGS. 7A and 7B are each a vertical sectional view of a rotor with a shaft body in which the rotary shaft 23 is attached to the rotor 22 FIG. 8A is a perspective view of the follower 80. FIG. 8B is a perspective view of the sliding shaft 70. FIG. 8C is a perspective view of the engaged member 60.

When the tablet cassette (FIGS. 1 to 4) according to the first embodiment and the tablet cassette 50 according to the present embodiment are contrasted with each other, the major changes include a change in the shape of the engaged member 60, a change in the structure of the follower 80 and a corresponding reduction in the constraint on the shape of the additional member containing space 22*c* of the rotor 22 and the addition of a displacement allowing mechanism (90, 91). The displacement allowing mechanism (90, 91) is composed of a washer 91 provided at the other end of the rotary shaft 23 which penetrates the bottom wall portion 21A, and an energy storing member 90 disposed between the washer 91 and the outer surface of the bottom wall portion 21A to store energy.

In the present embodiment, the upper surface portion of the additional member containing space 22*c* is in an inclined conical shape. As a result, the additional member containing space 22*c* is relatively large, and not only the lower cylindrical portion but also the upper hollow conical portion is thin and not significantly varied in thickness.

In addition, a cylindrical portion 22*d* is formed at the center of the additional member containing space 22*c* of the rotor 22 to project downward, and the center portion of the upper end surface of the hollow cylindrical portion 22*d* is further dented to form a bottomed hole 22*f* that is small in diameter and short in length. The upper portion of the coil spring 73 is received in the bottomed hole 22*f*, and the small diameter portion 23*ba* of the rotary shaft 23 is tightly fitted into the hollow cylindrical portion 22*d* of the rotor 22 to couple the rotor 22 and the rotary shaft 23 to each other as if they were an integral object.

In addition to the upper portion of the rotary shaft 23 to be coupled to the rotor 22 in this manner, the follower 80 which is provided at the upper portion of the rotary shaft 23, the engaging portions 71 of the sliding shaft 70 which project from the rotary shaft 23 and the engaged portions 61 and the cam portions 62 of the engaged member 60 which interfere with the engaging portions 71 and the follower 80, respectively, are also naturally received in the additional member containing space 22*c* of the rotor 22. When the small diameter portion 23*ba* at the upper end of the rotary shaft 23 is fitted in the cylindrical portion 22*d* of the rotor 22, in addition, the upper openings of the slits 23*b* are blocked by the cylindrical portion 22*d*, and the slits 23*b* serve as radial through holes.

As illustrated in FIG. 8C, the cam portions 62 which are provided on the engaged member 60 are shaped differently from the cam portions according to the first embodiment. The cam surfaces 62*a* of the cam portions 62 each include a gentle upward surface 62*b* and a steep downward surface 62*c*. The abutment portions 81 of the follower 80 abut against the cam surfaces 62*a* during movement to move the abutment portions 81 up and down. While portions of the cam surfaces 62*a* corresponding to the upward surfaces 62*b* are long surfaces gently inclined at 5° to 30°, for example, portions corresponding to the downward surfaces 62*c* are short surfaces steeply inclined at 70° to 90°, for example.

The follower 80 (see FIG. 8A) includes the abutment portions 81 and the circular ring portion 82. The inside diameter of the circular ring portion 82 is slightly larger than the outside diameter of a portion 23*ca* of the small diameter portion 23*ba* of the rotary shaft 23 illustrated in FIGS. 7A and 7B. The portion 23*ca* (see FIG. 7B) with which the circular ring portion 82 is fitted is a portion of the small diameter portion 23*ba* at the upper portion of the rotary shaft 23 that is closer to the upper end of a portion in which the slits 23*b* are formed. The cylindrical portion 22*d* which constitutes a part of a boss of the rotor 22 is externally fitted with the portion 23*ca* in addition to the circular ring portion 82 of the follower 80. The abutment portions 81 are each constituted by the distal end of a curved arm-shaped portion configured to project in the radial direction from the outer edge of the circular ring portion 82 and thereafter be bent downward.

The displacement allowing mechanism (90, 91) is composed of a washer 91 provided at the other end of the rotary shaft 23 which penetrates the bottom wall portion 21A, and an energy storing member 90 disposed between the washer 91 and the outer surface of the bottom wall portion 21A to store energy. The energy storing member 90 (see FIGS. 5 and 6) is a coil spring, the inside diameter of which is slightly larger than the outside diameter of the rotary shaft 23 and is loosely fitted with the outer peripheral portion in the vicinity of the lower end of the rotary shaft 23 which is rotatably inserted to the tablet container 21. The energy storing member 90 may be a different member that is an elastic member or a spring that may be externally mounted to a portion of the rotary shaft 23 configured to project downward from the tablet container 21 After the energy storing member 90 is externally mounted to the rotary shaft 23, the energy storing member 90 is compressed by pushing up the lower end of the energy storing member 90 using the washer 91 and then the washer 91 is externally fixed to the lower end portion of the rotary shaft 23. Then, with the upper end portion of the energy storing member 90 abutting against the bottom portion of the tablet container 21 And with the lower end portion of the energy storing member 90 abutting against the washer 91, the resilient force of the energy storing member 90 acts in the direction of vertically moving the two members (21 And 91) away from each other. Since the washer 91 is secured to the rotary shaft 23 and the rotary shaft 23 is secured to the rotor 22, however, the energy storing member 90 biases the rotor 22 downward with reference to the tablet container 21.

The mode of use and operation of the tablet cassette 50 according to the second embodiment will be described. When the tablet cassette 50 is removed from the drive portion 30 (see FIG. 6A), the drive shaft 33 is extracted from the rotary shaft 23. Thus, the sliding shaft 70 is released from pushing, and pushed downward by the coil spring 73 located above the sliding shaft 70, in addition to its own weight, to be lowered. As the sliding shaft 70 is lowered, the engaging portions 71 are lowered toward the engaged member 60. Thus, the engaging portions 71 are slightly fitted into recessed portions of the plurality of engaged portions 61 directly below the engaging portions 71. This engaging action inhibits rotation of the rotary shaft 23.

When the tablet cassette 50 is attached to the drive portion 30 (see FIG. 6B), meanwhile, the drive shaft 33 is fitted into the rotary shaft 23 so that the two shafts are meshed with each other, and the sliding shaft 70 is pushed up by the drive shaft 33 to be raised against the weight of the sliding shaft 70 itself and the biasing force of the coil spring 73. Accordingly, the engaging portions 71 are raised to be disengaged from the engaged portions 61 of the engaged member 60. Thus, the drive shaft 33 adequately drives rotation of the rotary shaft 23 and hence rotation of the rotor 22. Therefore, each time the drive shaft 33 is rotated, the rotor 22 is also rotated. This feeds the partition walls 22*a* and hence the tablet containing spaces 22*b* forward to allow the tablets, which have been carried to a location below the partition member 25 in the tablet containing space 22*b*, to fall down one by one through the discharge path 24.

When the rotor 22 is rotated as described above, further, the follower 80 which is mounted thereto is also rotated. Accordingly, the abutment portions 81 make circular movement. In the present embodiment, the abutment portions 81 abut against the cam portions 62 each time the follower 80 makes a half rotation. Then (see FIG. 7), the abutment portions 81 first ride on the upward surfaces 62B of the cam portions 62 to be raised by an amount B of displacement in the vertical direction. Thus, the rotary shaft 23 to which the circular ring portion 82 of the follower 80 is mounted and the rotor 22 to which the rotary shaft 23 is mounted are raised by the amount B. In that event, a reaction force against the rise is generated by the respective weights of the rotary shaft 23, the sliding shaft 70 which is provided in the rotary shaft 23, the rotor 22 and the tablets which are located on the rotor 22 and, further, the depressing force of the energy storing member 90. Since the upward surfaces 62B are gentle slopes, however, thrust that is stronger than the reaction force is generated to slowly raise the abutment portions 81 and hence the rotor 22. Thus, the rotor 22 is reliably raised with no unreasonable load on the abutment portions 81 or the cam portions 62.

Next, the abutment portions 81 which have been raised are lowered by the amount B along the downward surfaces 62*c* of the cam portions 62 at this time, since the downward surfaces 62*c* are steep slopes, the follower 80 is strongly biased downward by the pressing force of the energy storing member 90 in addition to the respective weights of the portions 22, 23, 70, and 80 themselves. As a result, the abutment portions 81 (and hence the rotor 22 are quickly lowered along the downward surfaces 62*c*.

Therefore, the tablets which have been located on the rotor 22 are vertically swung in the tablet container 21. Thus, even if a large number of tablets have been agglomerated, such tablets are immediately disentangled, particularly because the rotor 22 is quickly lowered.

Third Embodiment

A specific configuration of a tablet cassette 50 according to a third embodiment of the present invention will be described with reference to the drawings.

Figure 9A:
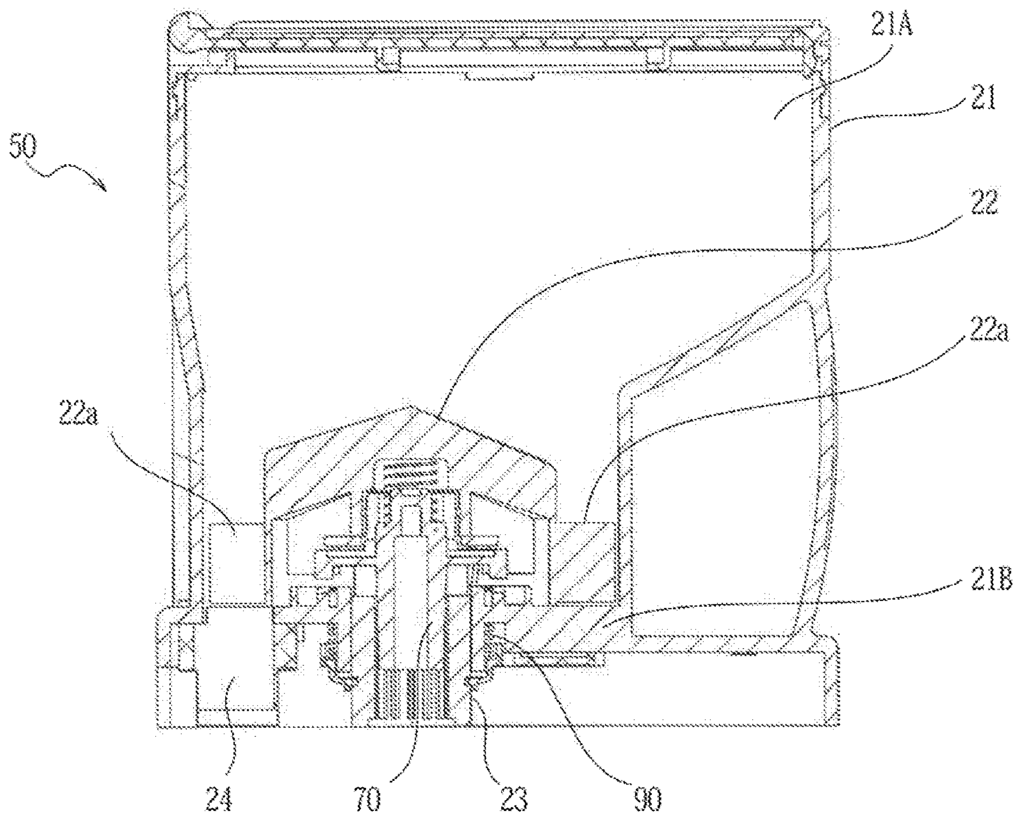
FIG. 9A is a vertical sectional view of the entire tablet cassette according to a third embodiment of the present invention.
Figure 9B:
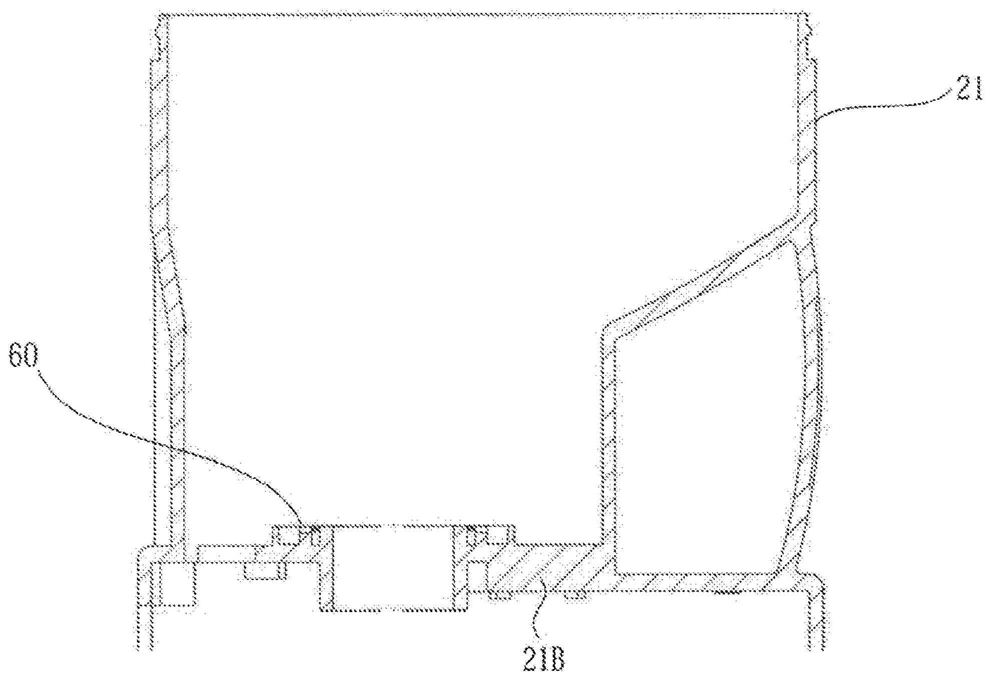
Figure 10A:
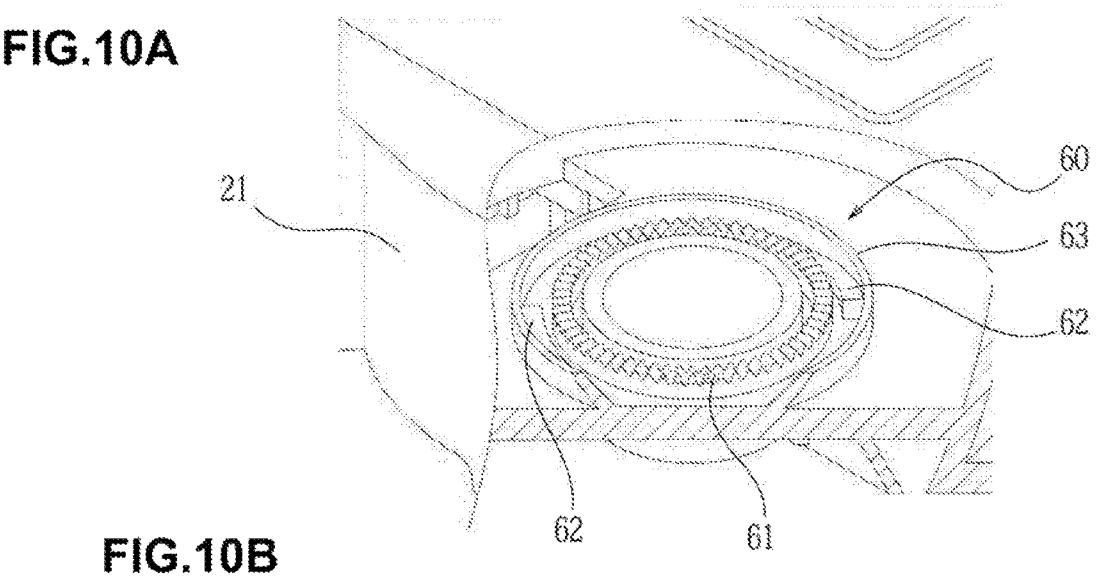
FIG. 10A is a perspective view illustrating a portion of the tablet container to which an engaged member and cam portions are mounted.
Figure 10B:
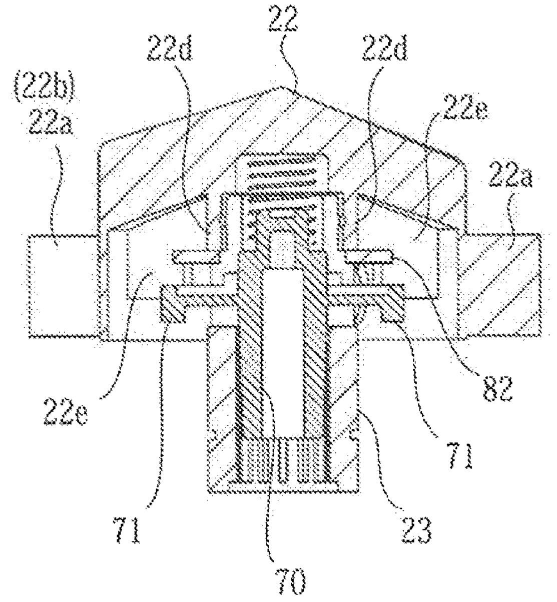
FIG 10B is a vertical sectional view of a rotor with a rotary shaft including engaging portions.
Figure 10C:
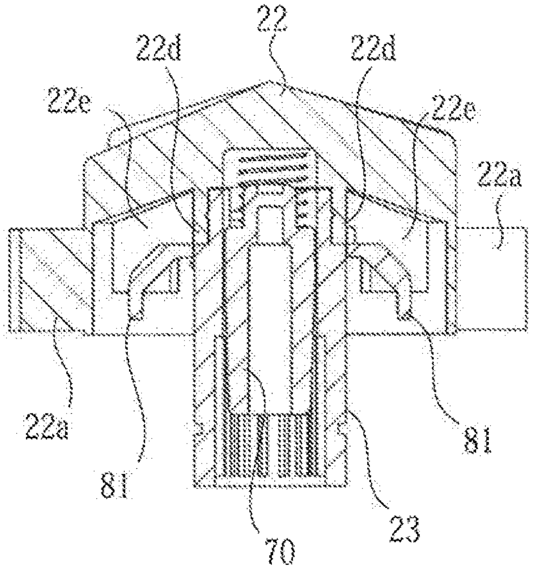
FIG. 10C is a vertical sectional view of the rotor with the rotary shaft including a follower.
Figure 10D:
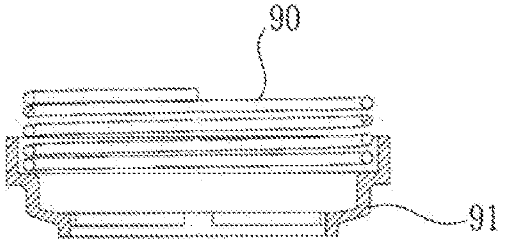
FIGS. 10D and 10E are each a vertical sectional view of a displacement allowing mechanism.
Figure 10E:
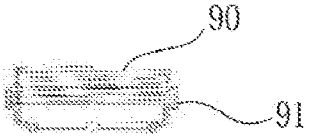
Figure 11:
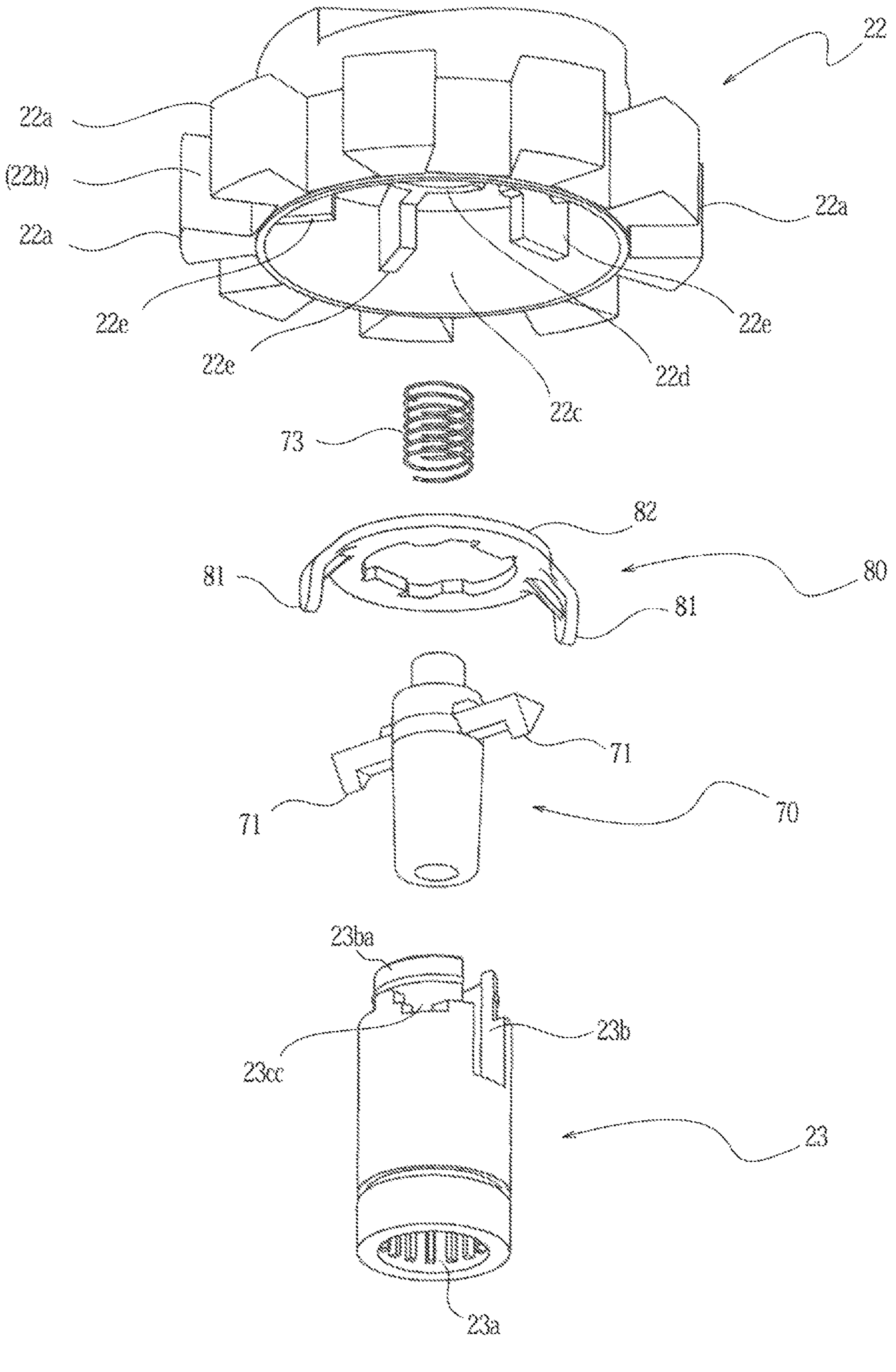
FIG. 11 is a developed perspective view of the rotor with the rotary shaft.

FIG. 9A is a vertical sectional view of the entire tablet cassette 50, and FIG. 9B is a vertical sectional view of the tablet container 21. FIG. 10A is a perspective view illustrating a portion of the tablet container 21 to which the engaged member 60 and the cam portions 62 are mounted, FIG. 10B is a vertical sectional view of the rotor 22 with a shaft body, including the engaging portions 71 of the sliding shaft 70, FIG. 10C is a vertical sectional view of the rotor 22 with the shaft body, including the abutment portions 81 of the follower 80, FIGS. 10D is an enlarged vertical sectional view of the energy storing member 90 and the washer 91 and FIG. 10E is a vertical sectional view of the energy storing member 90 and the washer 91. FIG. 11 is a developed perspective view of the rotor 22 with the shaft body.

In the tablet cassette 50 according to the third embodiment (see FIG. 9), the tablet container 21 is formed to be thin to the bottom wall portion 21A, and an openable lid is mounted to the upper end opening of the tablet container 21. In addition, the peripheral portion of the insertion hole for the rotary shaft 23, of the bottom wall portion 21A of the tablet container 21, is slightly dented from below, and the energy storing member 90 and the upper end portion of the washer 91 are received in the dented portion. Further [see FIG. 10A], an annular portion 63 that is similar to a surrounding fence is formed on the engaged member 60 on the outer peripheral side of the engaged portions 61 and the cam portions 62, to enhance the rigidity and the strength of the cam portions 62 and to prevent diffusion of dust from the inner side.

In addition [see FIGS. 10B, 10C, and 11], a plurality of, e.g. six, ribs 22*e* are formed in a radial arrangement in the additional member containing space 22*c* of the rotor 22. The ribs 22*e* are each in a vertical plate shape, and extends toward the outer peripheral side from the cylindrical portion 22*d* and extends downward from the upper surface of the additional member containing space 22*c*. The ribs 22*e* support and reinforce the cylindrical portion 22*d*, into which the rotary shaft 23 is fitted, from the outer peripheral side. Further, the direction in which the engaging portions 71 of the sliding portion 70 project [see FIG. 10B and 11] and the direction in which the abutment portions 81 of the follower 80 project [see FIGS. 10C and 11] are not the same as but are shifted from each other in the circumferential direction.

As illustrated in FIGS. 10D and 10E, in addition, the diameter of the washer 91 is varied in three steps from the large diameter at the upper portion to the small diameter at the lower portion, and a portion of the washer 91 to support the energy storing member 90 and a portion of the washer 91 to be attached to the rotary shaft 23 are vertically away from each other.

Further, as illustrated in FIG. 11A small engagement recessed portion 23*cc* is formed at the outer peripheral portion of the upper portion of the rotary shaft 23. Not only the slits 23*b* but also the engagement recessed portion 23*cc* interferes with the inner peripheral portion of the circular ring portion 82 to conveniently and adequately prevent the follower 80 from idling to impede movement of the abutment portions 81.

While the engaged member 60 is retrofitted to the tablet container 21 in the second and third embodiments described above, the engaged member 60 and the tablet container 21 maybe an integral object prepared together by molding or the like. In the second and third embodiments described above, in addition, the plurality of cam portions 62 are provided at opposite positions to smoothly move the follower 80 and hence the rotor 22 vertically and not to generate a force to tilt the rotary shaft 23 and so forth, in order not to damage the members. If there is no problem with smooth operation of the members or damage to the members, however, the cam portions 62 may be provided at any position, rather than the opposite positions.

Fourth Embodiment

A fourth embodiment resolves further technical issues and problems of the follower according to the first to third embodiments. That is, it is not clear for all of a wide diversity of tablets what performance is required of the agglomerated tablet disentangling function, which is achieved through cooperation of the follower 80 and the cam portions 62 and whether or not the agglomerated tablet disentangling function is required in the first place. While such issues have been answered to a degree for tablets that have been sufficiently used with the tablet cassette, the issues are unanswered for tablets that have not been sufficiently used and new tablets to be used. Therefore, it is necessary to use such tablets over and over in order to grasp the degree to which the agglomerated tablet disentangling function is required, which takes time.

On the other hand, providing the agglomerated tablet disentangling function at all times even if it is not necessary may shorten the life of the cam portions and the follower or excessively stimulate the tablets, and thus is preferably avoided as much as possible. In order to address both the cases, it is conceivable to first use a tablet cassette with no agglomerated tablet disentangling function for tablets for which the need for such a function is unknown, and to switch to use a tablet cassette with the agglomerated tablet disentangling function when the need for such a function is revealed. However, the old tablet cassette may highly likely be wasted, and it may take trouble to manufacture and adjust the new tablet cassette.

Thus, it is conceivable to first use a tablet cassette with no agglomerated tablet disentangling function for tablets for which the need for such a function is unknown, and to add the agglomerated tablet disentangling function to the tablet cassette being used, or enhance the agglomerated tablet disentangling function, when the need for such a function is revealed. In order to conveniently add or enhance the agglomerated tablet disentangling function, it is considered to be preferable to mount the cam portions, which can be easily integrated with the engaged member by molding or the like, to the tablet cassette in advance, and to allow the corresponding follower to be easily mountable/detachable and replaceable as necessary.

When the tablet cassettes 50 according to the first to third embodiments are assembled again with the follower 80 detached, however, the amount by which the small diameter portion at the upper end of the rotary shaft 23 is fitted in the cylindrical portion **22*d* of the rotor 22 is not stable, and the entire length of the small diameter portion is inserted into the cylindrical portion 22*d* in not a small number of cases. If the amount by which the small diameter portion is fitted is increased, the lower end surfaces of the slits 23*b* and hence the lowered position of the sliding shaft 70 are raised, and the engaging portions 71 may not reach the engaged portions 61. Therefore, undesired measures of further deepening the slits 23*b* are required, in spite of the risk of weakening the rotary shaft 23. Further, with the upper end of the small diameter portion of the rotary shaft 23, which is fitted in the cylindrical portion 22*d* of the rotor 22, reaching a farther position, the slits 23*b* of the rotary shaft 23 may be undesirably deformed to be narrowed with a bending force applied to the distal end of the small diameter portion of the rotary shaft 23, if the hole diameter of the middle portion of the bottomed hole 22*f* of the rotor 22 is too small for a portion of the small diameter portion of the rotary shaft 23** newly fitted in the hole.

Thus, it is a technical issue to achieve a tablet cassette that can add or enhance the agglomerated tablet disentangling function by allowing the follower 80 to be mounted to and removed from the rotary shaft 23 or replaced, without incurring the undesired measures or the undesired deformation discussed above.

The tablet cassette according to the fourth embodiment resolves such an issue. In the present embodiment, excessive fitting inhibiting means is provided to avoid full abutment between the cylindrical portion **22*d* and the large diameter portion of the rotary shaft 23 by securing a distance between an annular end surface at the lower end of the cylindrical portion 22*d* and an annular end surface at the upper end of the large diameter portion of the rotary shaft 23 when the cylindrical portion 22*d* and the small diameter portion of the rotary shaft 23** are fitted with each other.

Figure 12A:
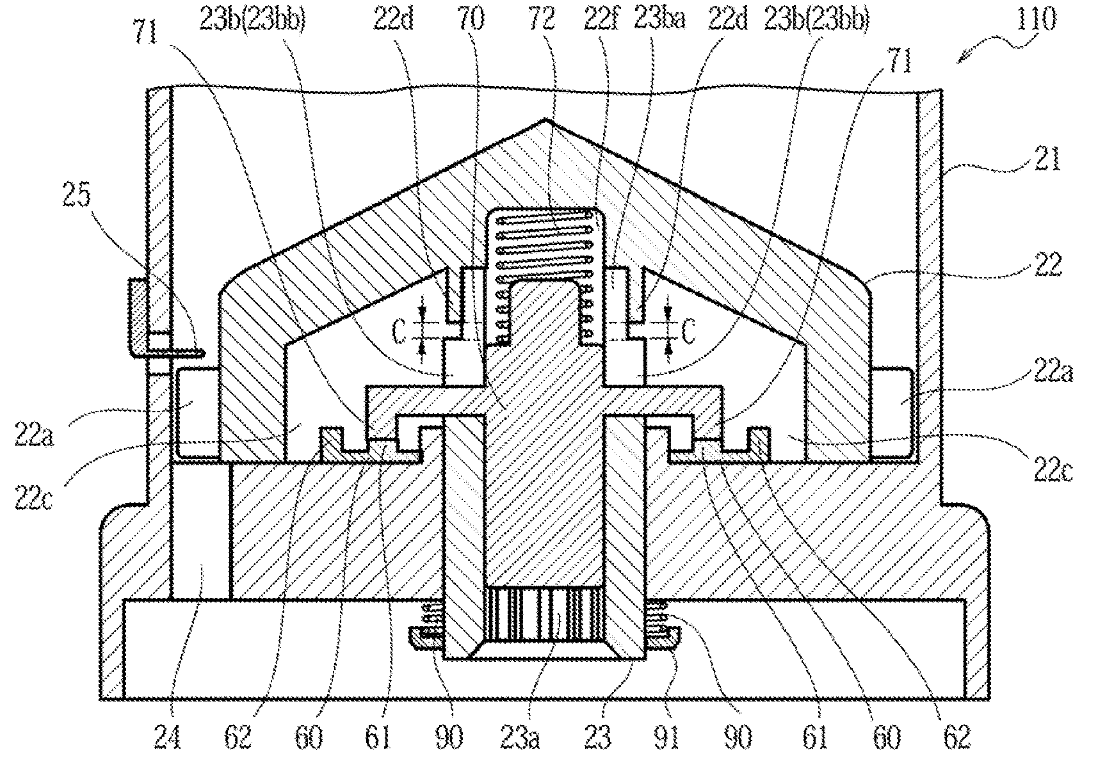
FIG. 12A is a vertical sectional view of a tablet cassette according to a fourth embodiment of the present invention in a free state, and FIG. 12B includes a vertical sectional view of a rotor and a rotary shaft in a separated state and an enlarged view of a part thereof.
Figure 12B:
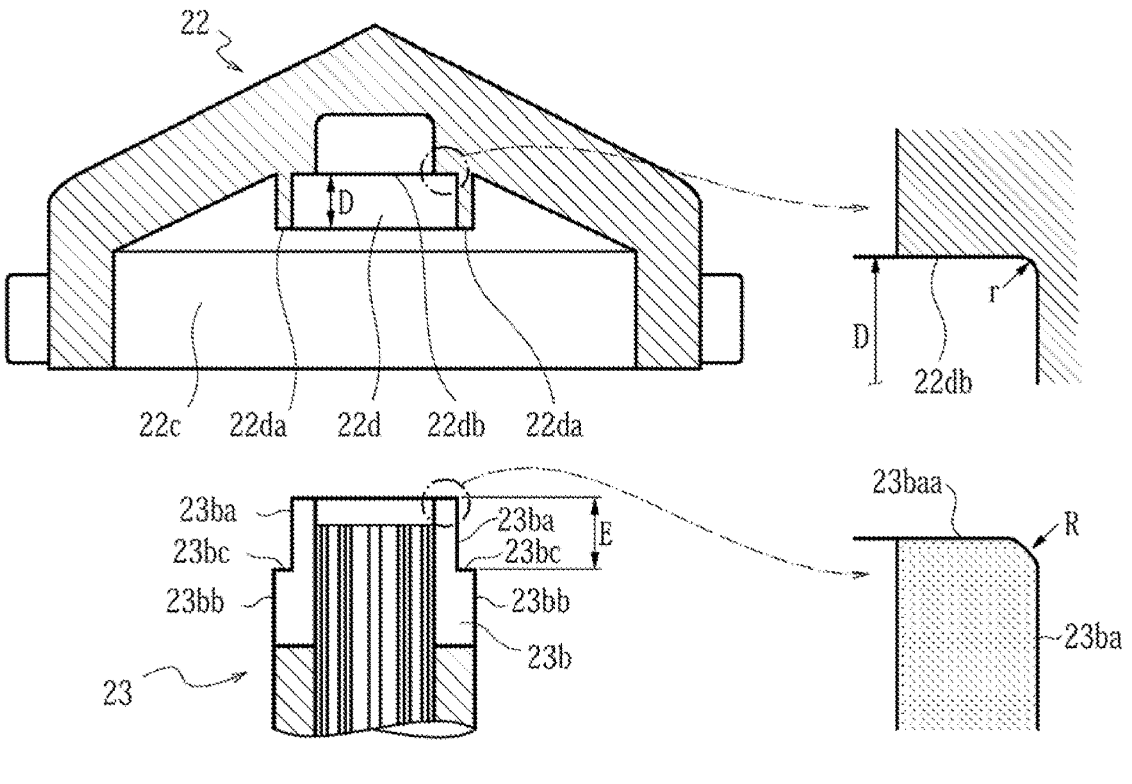

FIG. 12A is a vertical sectional view of a tablet cassette 110 according to the fourth embodiment in a free state, and FIG. 12B includes a vertical sectional view of the rotor 22 and the rotary shaft 23 in a separated state and an enlarged view of a part thereof. The tablet cassette 110 is obtained by further improving the tablet cassette 50 according to the third embodiment to allow the follower 80 to be conveniently mounted to and removed from the rotary shaft 23 or replaced. Thus, differences from the tablet cassette 50 will be mainly described below.

The main differences of the tablet cassette 110 from the tablet cassette 50 include a feature that the tablet cassette 110 has been assembled without the follower 80, and a feature that the shape of the fitting portion between the rotor 22 and the rotary shaft 23 is prescribed such that the state of attachment of the rotary shaft 23 to the rotor 22 is not significantly varied even if the follower 80 is additionally externally mounted to the rotary shaft 23 later.

That is, as illustrated in FIG. 12A, the tablet cassette 110 does not include the follower 80 but includes the other components such as the tablet container 21, the rotor 22, the rotary shaft 23 and the engaged member 60, for example. Further, as excessive fitting inhibiting means for inhibiting excessive fitting between the rotor 22 and the rotary shaft 23 due to the exclusion of the follower 80, the shape of the fitting portion between the rotor 22 and the rotary shaft 23 is prescribed such that a distance C between facing surfaces, which is equivalent to the thickness of the follower 80, is secured between the cylindrical portion of the rotor 22 and the large diameter portion **23*bb* of the rotary shaft 23 even without the follower 80**.

More particularly, a length D of a portion that can be fitted, which corresponds to the distance from a lower-end annular surface **22*da* of the cylindrical portion 22*d* to a downward-facing surface portion 22*bd* of the stepped portion of the hollow cylindrical portion 22*d* in the additional member containing space 22*c* of the rotor 22, is shorter than the length of the small diameter portion 23*ba*, which corresponds to the distance from an upper-end annular surface 23*bc* of the large diameter portion 23*bb* at the upper end portion of the rotary shaft 23 to an upper end surface 23*baa* of the small diameter portion 23*ba***, namely a length E of the small diameter portion in the axial direction, by the distance C described above.

As illustrated in the right portion of FIG. 12B, in addition, an amount R of chamfering at the corner portion on the outer peripheral side of the upper end surface **23*baa* of the rotary shaft 23 is larger than the roundness of an unprocessed corner portion on the outer peripheral side of the downward-facing surface portion 22*db* of the cylindrical portion 22*d* of the rotor 22. Similarly, although not illustrated in an enlarged view, the amount of chamfering at the corner portion on the inner peripheral side of the lower-end annular surface 22*da* of the cylindrical portion 22*d* of the rotor 22 is larger than the roundness on the inner peripheral side of the upper-end annular surface 23*bc* of the rotary shaft 23. Moreover, the lower-end annular surface 22*da*, the downward-facing surface portion 22*db*, the upper end surface 23*baa*, and the upper-end annular surface 23*bc* are all orthogonal to the axial line of the rotor 22 and the rotary shaft 23. Therefore, as illustrated in FIG. 12A, in the tablet cassette 110 which is assembled with the small diameter portion 23*ba* of the rotary shaft 23 fitted in the cylindrical portion 22*d* of the rotor 22, the downward-facing surface portion 22*db* and the upper end surface 23*baa* directly oppose and tightly contact each other, and the lower-end annular surface 22***da* and the upper-end annular surface 23*bc* directly oppose each other, the distance C away from each other.

The mode of use and operation of the tablet cassette 110 according to the present embodiment will be described. The use of the tablet cassette 110 to contain tablets in a random manner and sequentially discharge the tablets is the same as that according to the first to third embodiments, and the demonstration of the rotation inhibiting function at the time when the tablet cassette 110 is removed by means for inhibiting rotation of the rotor when the tablet cassette 110 is not mounted, including the engaged portions 61 and the engaging portions 71, is also the same as that according to the first to third embodiments discussed above. Thus, such use of the tablet cassette 110 and demonstration of the rotation inhibiting function will not be repeatedly described in detail, and the method of converting the tablet cassette 110 into the tablet cassette 50 by adding the follower 80 will be mainly described below.

It is desirable that the means for inhibiting rotation of the rotor when the tablet cassette is not mounted should be provided, if the burden of the cost is not taken into consideration. However, it is preferable to add the agglomerated tablet disentangling function after determining the need for the function as discussed above. Thus, for tablets for which the need for the agglomerated tablet disentangling function is unknown, the tablet cassette 110 with the rotation inhibiting function but without the agglomerated tablet disentangling function is first adopted.

When the agglomerated tablet disentangling function becomes necessary, or when the agglomerated tablet disentangling function is not that necessary but it is considered to be preferable to use the agglomerated tablet disentangling function, as the tablet cassette 110 is continuously used to contain tablets in a random manner and sequentially discharge the tablets, the tablet cassette 110 that has been used is converted into the tablet cassette 50 by adding the follower 80 to be continuously used, rather than stopping the use of the tablet cassette 110 that has been used and adopting a separate tablet cassette 50 in place thereof.

Specifically, the rotor 22 and the rotary shaft 23 are separated from each other by detaching the energy storing member 90 from the rotary shaft 23, extracting the rotor 22 from the tablet container 21 together with the rotary shaft 23 and further extracting the small diameter portion 23*ba* of the rotary shaft 23 from the cylindrical portion 22*d* of the rotor 22.

Then, the rotor 22 and the rotary shaft 23 are returned to a coupled state by inserting the small diameter portion 23*ba* of the rotary shaft 23 into the hole of the circular ring portion 82 of the follower 80 discussed above to externally mount the follower 80 to the rotary shaft 23 and fitting the small diameter portion 23*ba* of the rotary shaft 23 into the cylindrical portion 22*d* of the rotor 22.

Further, the tablet cassette 50 is completed by modifying the tablet cassette 110 by inserting the rotary shaft 23 back into the tablet container 21 together with the rotor 22 and attaching the energy storing member 90 back to the rotary shaft 23. During that period, the sliding shaft 70 may be mounted in the rotary shaft 23.

This allows use of the tablet cassette 50 which demonstrates the agglomerated tablet disentangling function in addition to the function of inhibiting rotation of the rotor when the tablet cassette is not mounted. Moreover, the tablet cassette 50 can be achieved, conveniently and without wasting the tablet cassette 110 being used, by additionally mounting the follower 80.

Moreover, the distance C in the tablet cassette 110 and the thickness of the circular ring portion 82 of the follower 80 which is additionally provided in the gap are substantially equal to each other. Thus, the state of attachment of the rotary shaft 23 to the rotor 22 and the relative positions of the rotary shaft 23, the tablet container 21 And the sliding shaft 70 are not significantly varied although the follower 80 is additionally mounted to the rotary shaft 23 afterward. When it is desired to enhance the agglomerated tablet disentangling function little by little, several followers 80 with different amounts of downward projection of the sliding portions 81 which are configured to project downward from the circular ring portion 82 may be used.

Fifth Embodiment

Figure 13A:
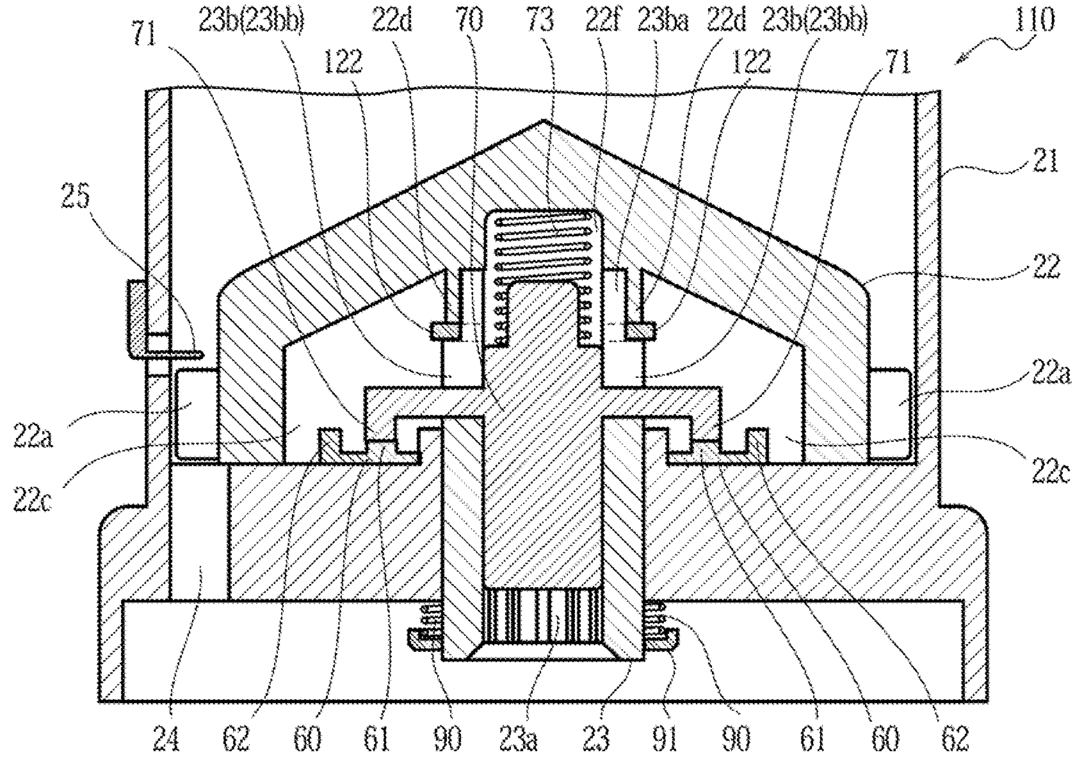
FIG. 13A is a vertical sectional view of a tablet cassette according to a fifth embodiment of the present invention in a free state.
Figure 13B:
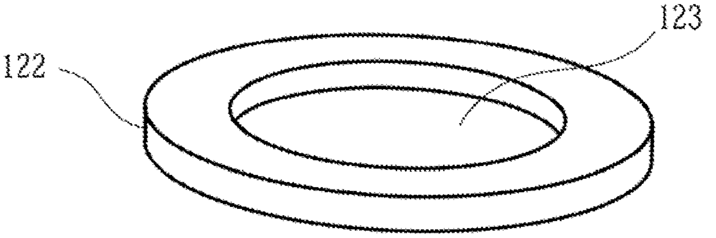
FIG. 13B is a perspective view of a plate-like member.
Figure 13C:
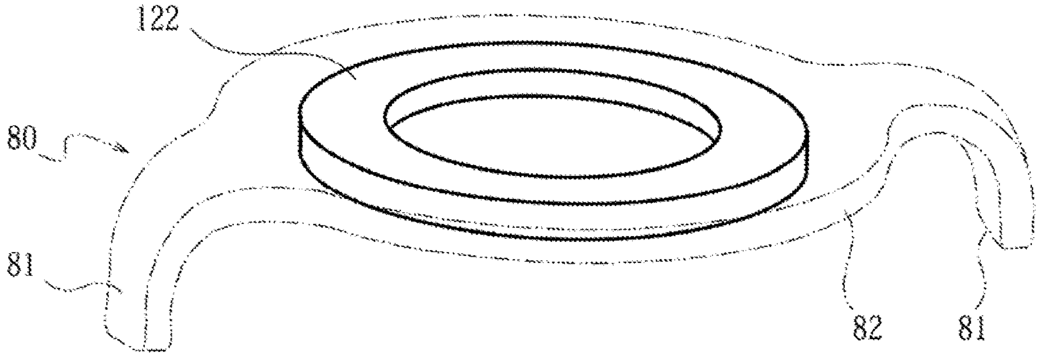
FIG. 13C is a perspective view of the plate-like member superposed on a follower illustrated as transparent.

A specific configuration etc. of a tablet cassette according to a fifth embodiment of the present invention will be described with reference to the drawings. FIG. 13A is a vertical sectional view of a tablet cassette 120 in a free state, FIG. 13B is a perspective view of a plate-like member 122 and FIG. 13C is a perspective view of the plate-like member 122 as superposed on the follower 80 illustrated as transparent. The tablet cassette 120 is also obtained by further improving the tablet cassette 50 according to the third embodiment discussed above to allow the follower 80 to be conveniently mounted to and removed from the rotary shaft 23 or replaced. Thus, differences from the tablet cassette 50 will be mainly described.

The tablet cassette 120 is different from the tablet cassette 50 in that the plate-like member 122 as excessive fitting inhibiting means is externally mounted to the rotary shaft 23 in place of the follower 80. When compared with the tablet cassette 110 according to the fourth embodiment discussed above, the processing condition etc. for the corner portion r etc. illustrated in FIG. 12B is relaxed for the tablet cassette 120 by disposing the plate-like member 122 between the lower-end annular surface 22*da* of the cylindrical portion 22*d* and the upper end surface 23*baa* of the small diameter portion 23*ba* of the rotary shaft 23.

The plate-like member 122 is a ring-shaped member obtained by cutting away a portion of the follower 80 other than the center portion of the circular ring portion 82 and an external mount hole 123 formed to penetrate the center of the plate-like member 122 and the plate thickness thereof are the same as those of the circular ring portion 82 of the follower 80. Therefore, the plate-like member 122 can be externally mounted to the small diameter portion 23*ba* of the rotary shaft 23 as with the follower 80. After externally mounting the plate-like member 122 to the rotary shaft 23 by passing the small diameter portion 23*ba* of the rotary shaft 23 through the external mount hole 123, the small diameter portion 23*ba* of the rotary shaft 23 is fitted into the cylindrical portion 22*d* of the rotor 22. With this configuration, a distance corresponding to the thickness of the plate-like member 122 is secured with the plate-like member 122 interposed between the lower-end annular surface 22*da* of the cylindrical portion 22*d* and the upper-end annular surface 23*bc* of the large diameter portion 23*bb* of the rotary shaft 23. Thus, abutment between the cylindrical portion 22*d* and the large diameter portion 23*bb* is avoided.

The use and operation of the tablet cassette 120 according to the fifth embodiment are the same as those of the tablet cassette 110 discussed above except for the plate-like member 122. Thus, redundant complicated description is not made, and the plate-like member 122 will be described below. The plate-like member 122 is interposed between the cylindrical portion 22*d* of the rotor 22 and the large diameter portion 23*bb* of the rotary shaft 23 in place of the follower 80 to keep the positional relationship between the rotor 22 and the rotary shaft 23, which are coupled to each other by fitting, the same as that when the follower 80 is interposed therebetween. In addition, while the plate-like member 122 is the same as the follower 80 in being externally mounted to the rotary shaft 23 and received in the additional member containing space 22*c* of the rotor 22, the plate-like member 122 is always located away from the cam portions 62 unlike the follower 80.

Thus, as discussed in relation to the fourth embodiment, when a tablet cassette is used for tablets for which the need for the agglomerated tablet disentangling function is unknown, the tablet cassette 120 which includes the function of inhibiting rotation when not mounted but which does not include the agglomerated tablet disentangling function is first used. When the agglomerated tablet disentangling function becomes necessary as the tablet cassette 120 is continuously used to contain tablets in a random manner and sequentially discharge the tablets, the tablet cassette 120 that has been used is converted into the tablet cassette 50 by adding the follower 80 to the tablet cassette 120 to be continuously used. This modification work can be conveniently and immediately performed by attaching and removing the rotary shaft 23 to and from the rotor 22 and replacing the plate-like member 122 with the follower 80 for the rotary shaft 23.

Sixth Embodiment

Figure 14A:
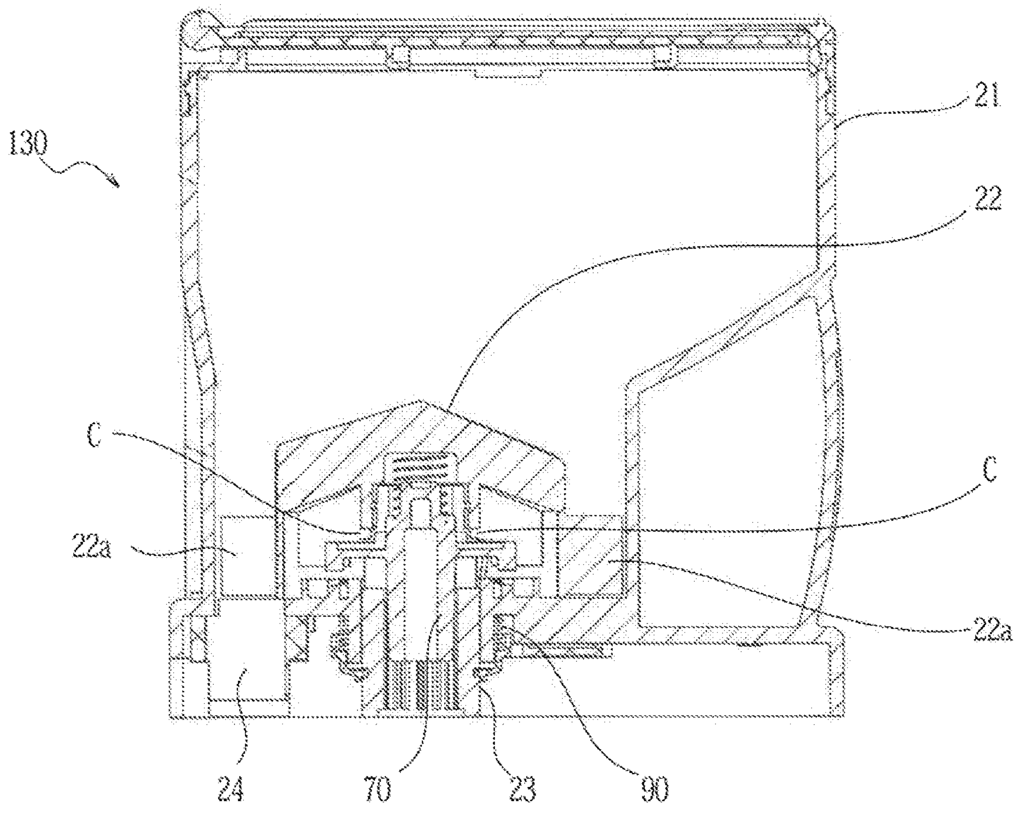
FIG. 14A is a vertical sectional view of the entire tablet cassette according to the fifth embodiment of the present invention.
Figure 14B:
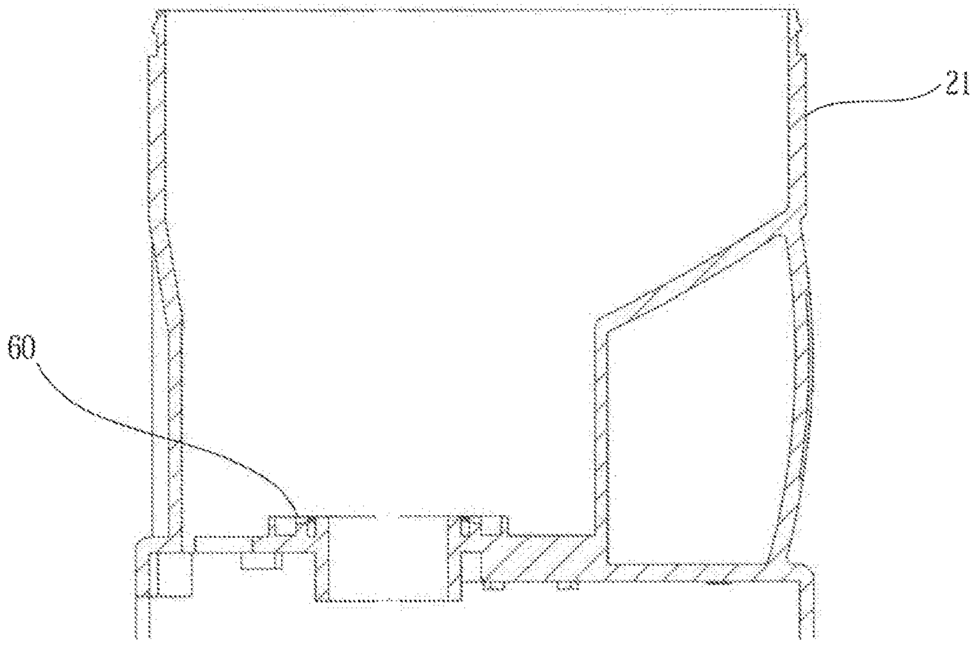
FIG. 14B is a vertical sectional view of a tablet container.
Figure 15A:
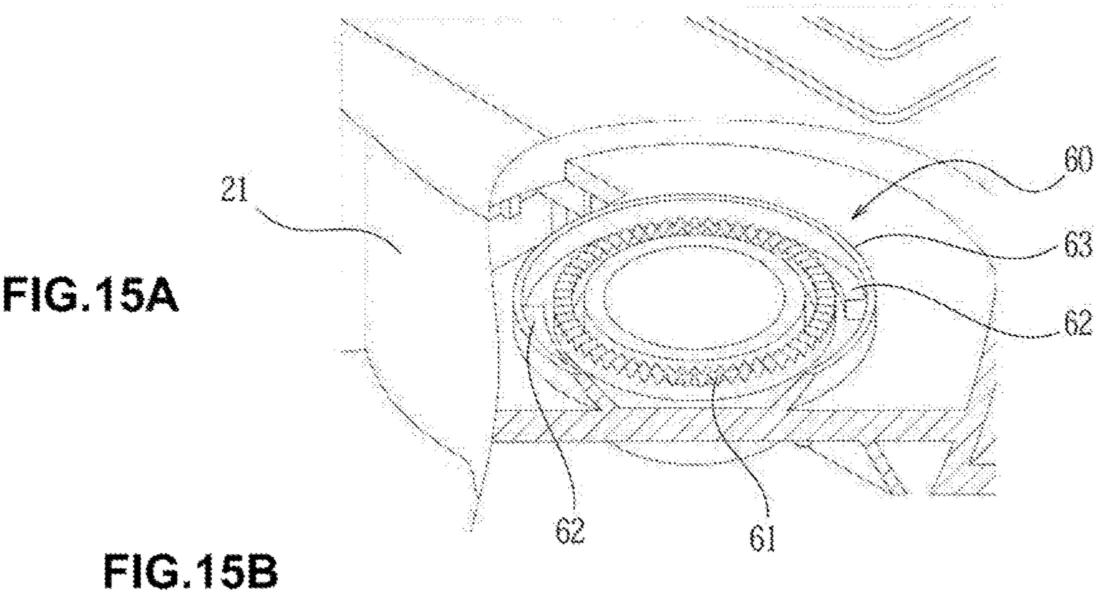
FIG. 15A is a perspective view illustrating a portion of the tablet container to which an engaged member and cam portions are mounted.
Figure 15B:
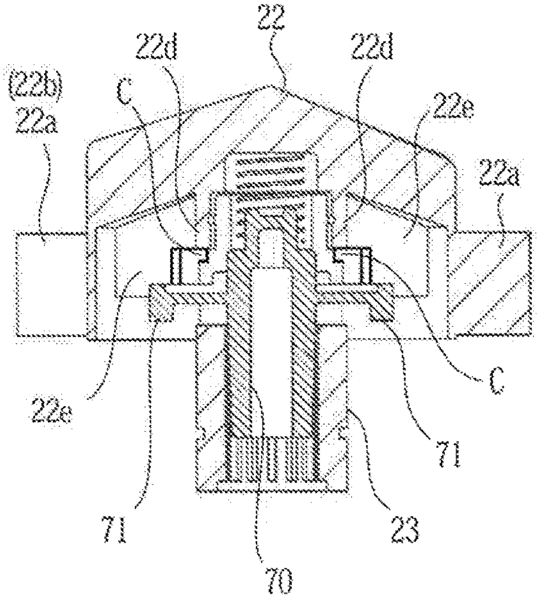
FIG. 15B is a vertical sectional view of a rotor with a rotary shaft including engaging portions.
Figure 15C:
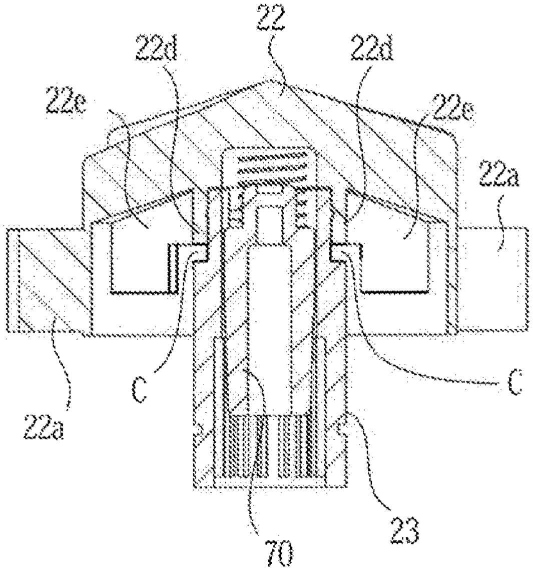
FIG. 15C is a vertical sectional view of the rotor with the rotary shaft not including the engaging portions.
Figure 16:
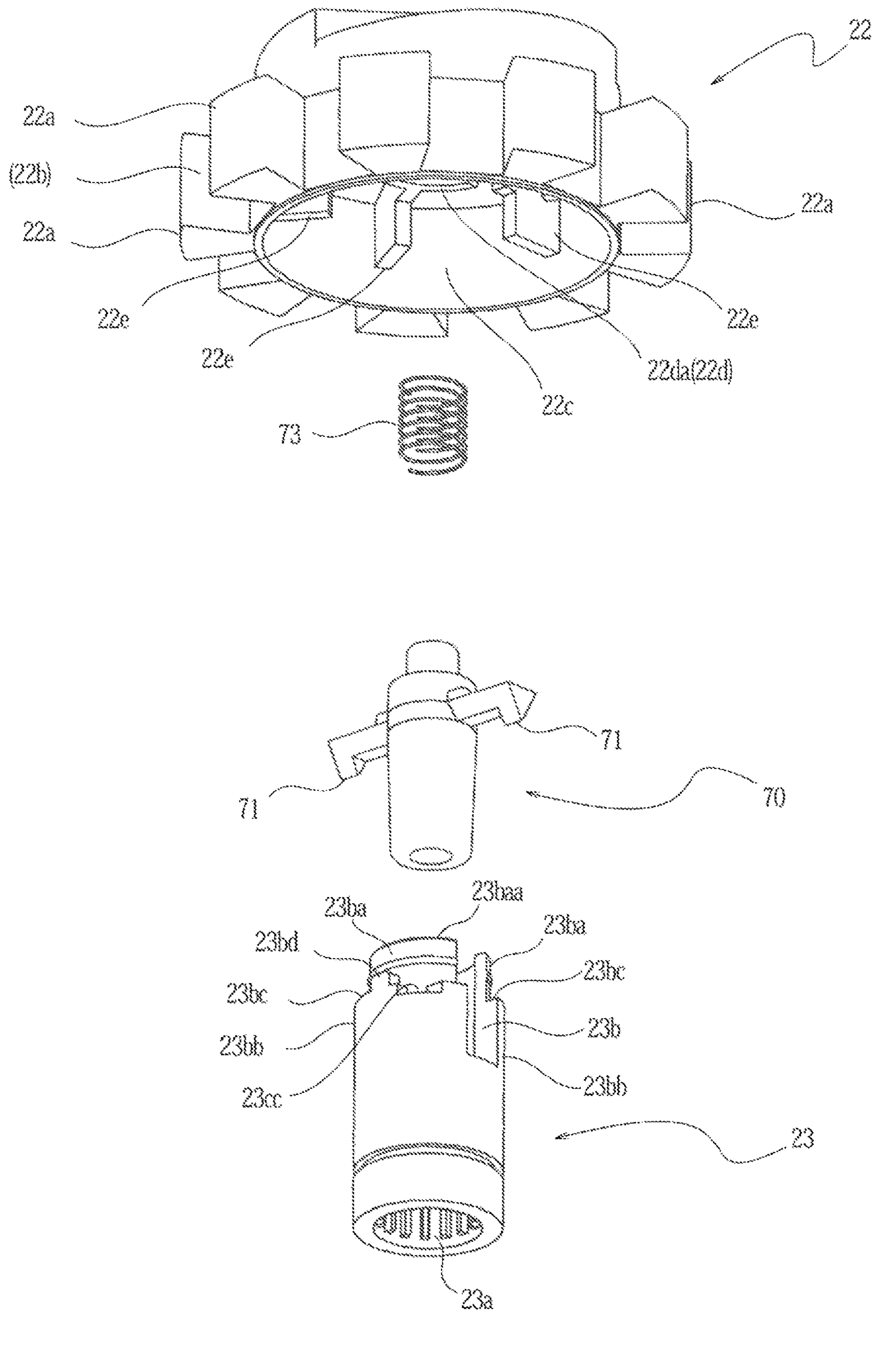
FIG. 16 is a developed perspective view of the rotor with the rotary shaft.
Figure 17A:
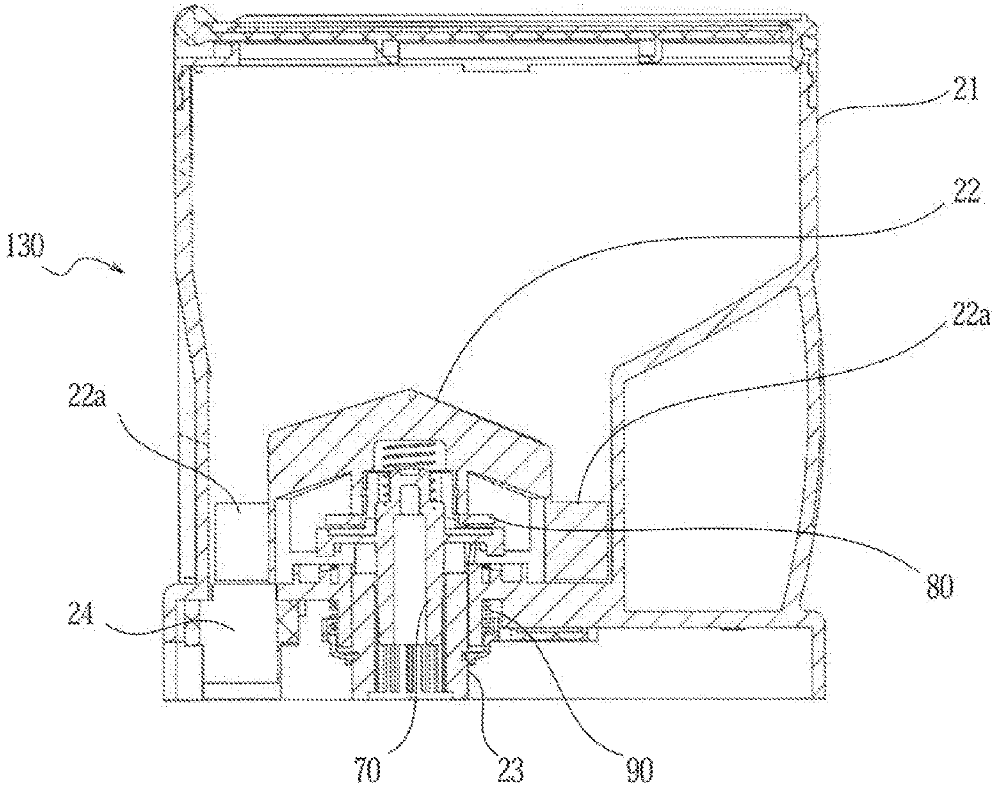
FIG. 17A is a vertical sectional view of the entire tablet cassette in which a follower has been added to the tablet cassette.
Figure 17B:
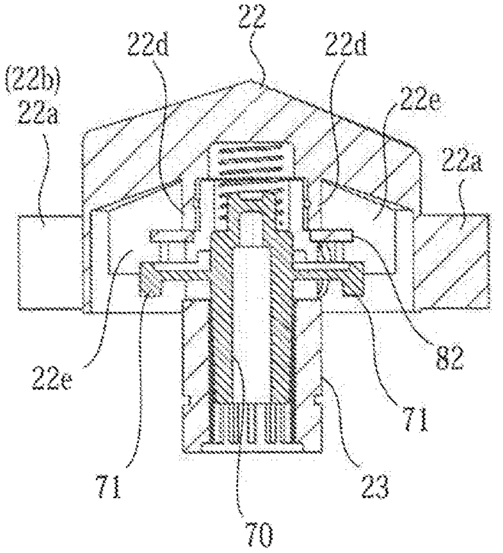
FIG. 17B is a vertical sectional view of a rotor with a rotary shaft including engaging portions.
Figure 17C:
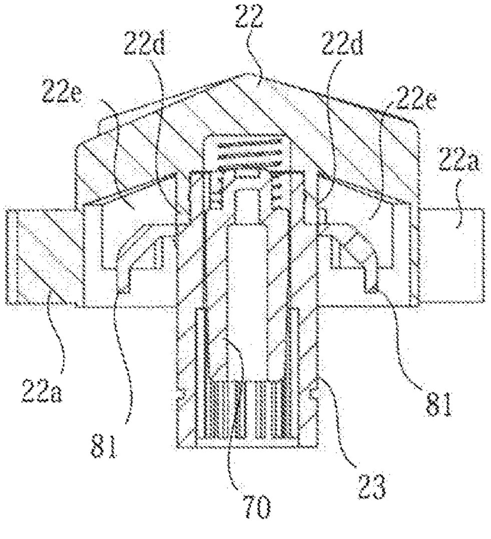
FIG. 17C is a vertical sectional view of the rotor with the rotary shaft including the follower.
Figure 18:
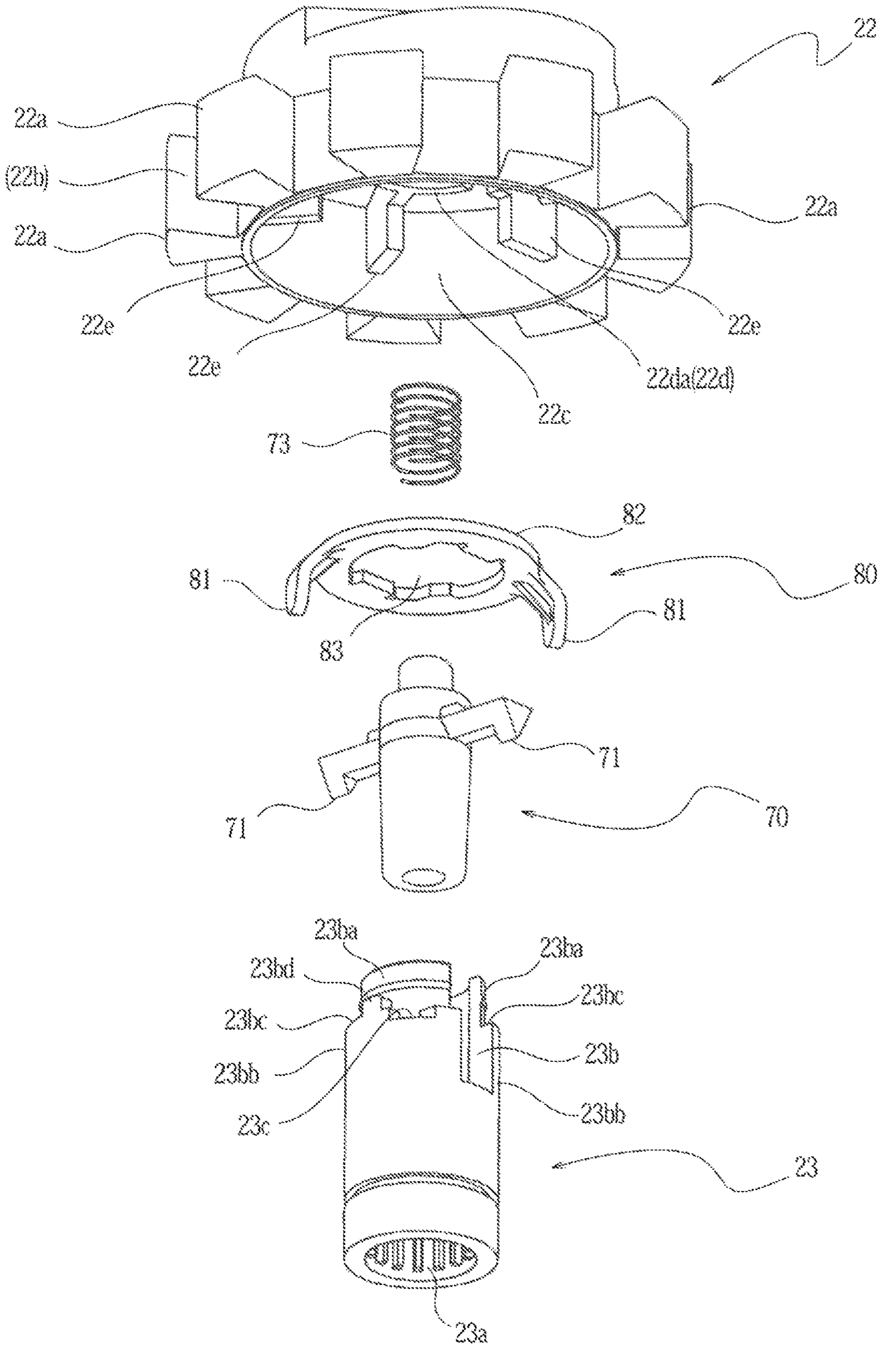
FIG. 18 is a developed perspective view of the rotor with the rotary shaft, to which the follower has been added.
Figure 19A:
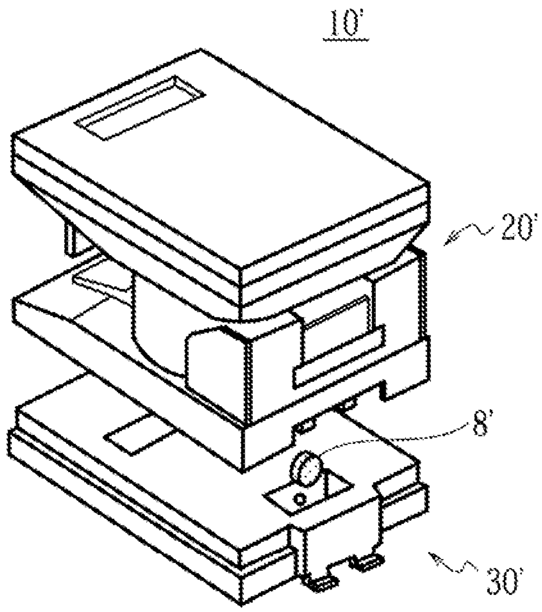
FIG. 19A is a perspective view illustrating the appearance of a tablet feeder according to the related art as seen from the right rear.
Figure 19B:
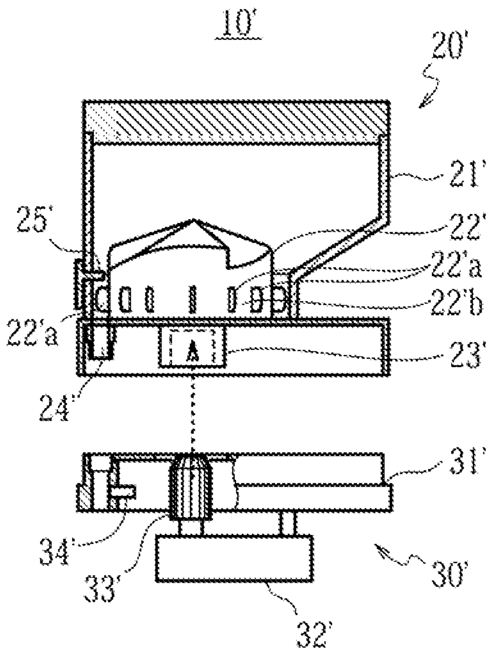
FIG. 19B is a vertical sectional left side view of the tablet feeder according to the related art.
Figure 19C:
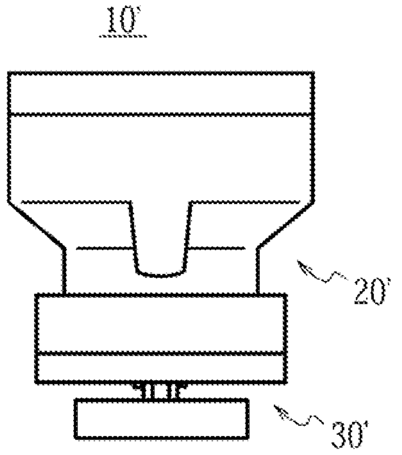
FIG. 19C is a front view thereof.
Figure 19D:
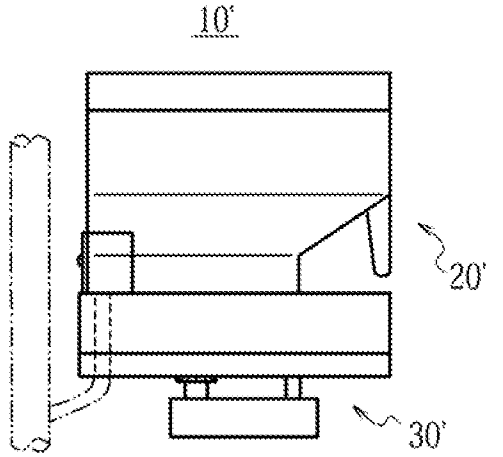
FIG. 19D is a left side view thereof.
Figure 20A:
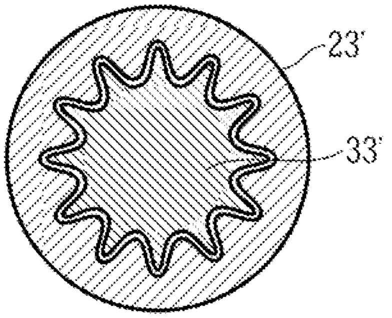
FIG. 20A is a cross-sectional view of a rotary shaft and a drive shaft in a fitted state.
Figure 20B:
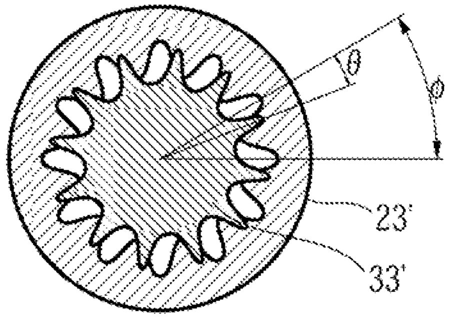
FIG. 20B is a cross-sectional view of the two shafts in a deviating state.

A specific configuration etc. of a tablet cassette according to a sixth embodiment of the present invention will be described with reference to the drawings. FIG. 14A is a vertical sectional view of the entire tablet cassette 130, and FIG. 14B is a vertical sectional view of the tablet container 21. FIG. 15A is a perspective view illustrating a portion of the tablet container 21 to which the engaged member 60 and the cam portions 62 are mounted, FIG. 15B is a vertical sectional view of the rotor 22 with the rotary shaft 23 including the engaging portions 71 and FIG. 15C is a vertical sectional view of the rotor 22 with the rotary shaft 23 not including the engaging portions 71. FIG. 16 is a developed perspective view of the rotor 22 with the rotary shaft 23. FIGS. 17A and 17C each illustrate a state in which the follower 80 has been added to the tablet cassette 130. FIG. 17A is a vertical sectional view of the entire tablet cassette 130, FIG. 17B is a vertical sectional view of the rotor 22 with the rotary shaft 23 including the engaging portions 71 and FIG. 17C is a vertical sectional view of the rotor 22 with the rotary shaft 23 not including the engaging portions 71. FIG. 18 is a developed perspective view of the rotor 22 with the rotary shaft 23, to which the follower 80 has been added.

The tablet cassette 130 is also obtained by further improving the tablet cassette 50 according to the second embodiment discussed above to provide excessive fitting inhibiting means such that the follower 80 can be conveniently mounted to and removed from the rotary shaft 23 or replaced. However, the specific configuration of the excessive fitting inhibiting means is different from that of the tablet cassettes 110 and 120 discussed above. In addition, the tablet cassette 130 is also modified for practical utility in consideration of a reduction in the material cost, ease of manufacture, and so forth. Thus, differences from the tablet cassette 120 discussed above will be mainly described while using the same reference numerals to the extent that there is no fear of confusion.

The first difference of the tablet cassette 130 from the tablet cassette 120 About the excessive fitting inhibiting means is that the plate-like member 122 which is removable is not mounted but instead a projecting portion 23*bd* is formed on the upper-end annular surface 23*bc* of the large diameter portion 23*bb* of the rotary shaft 23 to project upward along the small diameter portion 23*ba*. The projecting portion 23*bd* is provided on only a part of the upper-end annular surface 23*bc*, rather than the entirety thereof. It is desirable that a plurality of projecting portions 23*bd* should be disposed at axially symmetrical positions, although only one projecting portion 23*bd* suffices.

In addition, the amount of projection of the projecting portion 23*bd* is determined such that the distance C (see FIGS. 14A, 15B, and 15C) between the lower-end annular surface 22*da* of the cylindrical portion 22*d* of the rotor 22 and the upper-end annular surface 23*bc* of the large diameter portion 23*bb* of the rotary shaft 23 is equal to the thickness of the circular ring portion 82 of the follower 80 (see FIG. 18). If the lower-end annular surface 22*da* has no recess or projection, the amount of projection of the projecting portion 23*bd* is preferably equal to the thickness of the circular ring portion 82. In the case where the lower-end annular surface 22*da* has a recess and the distal end portion of the projecting portion 23*bd* is received in the recess, it is desirable that the amount of projection of the projecting portion 23*bd* should be increased by an amount corresponding to the portion to be received in the recess.

Also for the tablet cassette 130 including such excessive fitting inhibiting means, as discussed in relation to the tablet cassette 110 according to the fourth embodiment, when the tablet cassette is used for tablets for which the need for the agglomerated tablet disentangling function is unknown, the tablet cassette 130 which includes the function of inhibiting rotation of the rotor when not mounted but which does not include the agglomerated tablet disentangling function is first used. When the agglomerated tablet disentangling function becomes necessary as the tablet cassette 130 is continuously used to contain tablets in a random manner and sequentially discharge the tablets, the tablet cassette 130 that has been used is converted into a tablet cassette that is equivalent to the tablet cassette 50 by adding the follower 80 to the tablet cassette 130 to be continuously used (see FIG. 17). This modification work can also be conveniently and immediately performed by attaching and removing the rotary shaft 23 to and from the rotor 22 and adding the follower 80 to the rotary shaft 23 (see FIG. 18).

Since the projecting portion 23*bd* has been added to the rotary shaft 23 as discussed above, a hole 83 configured to penetrate the center of the circular ring portion 82 of the follower 80 (see FIG. 18) is not in a simple circular shape, but a notched portion is formed at a part of the edge portion of the hole 83 to be widened in the radial direction to allow the projecting portion 23*bd* to pass therethrough. Moreover, the edge portion of the hole 83 illustrated in the drawing also includes portions with a reduced radial dimension fitted in the upper portions of the slits 23*b* to block the opening portions of the slits 23*b* in order to reinforce the large diameter portion 23*bb* and the small diameter portion 23*ba*.

In the tablet cassette 130 (see FIGS. 14 and 17), further, the tablet container 21 is formed to be thin to the bottom portion, and an openable lid is mounted to the upper end opening of the tablet container 21.

In addition, as illustrated in FIGS. 14A and 17A, an annular recessed portion is formed at the peripheral portion of the hole for insertion of the rotary shaft 23, of the bottom wall portion 21A of the tablet container 21 And the energy storing member 90 and the upper end portion of the washer 91 are received in the annular recessed portion.

In the fourth to sixth embodiments described above, each of the tablet cassettes 110, 120 and 130 includes the engaged member 60 as an integrally formed object, as with the tablet cassette 50 according to the first and second embodiments. In addition, the engaged member 60 includes the plurality of engaged portions 61 and cam portions 62 on the outer peripheral side, with the engaged portions 61 and the cam portions 62 integrally formed with each other. As a matter of course, however, the plurality of engaged portions 61 and cam portions 62 maybe integrally formed with the tablet container 21. While pressing and injection molding are suitable as the integral formation method for mass production, the integral formation may be performed by fusing, welding, or the like for low-volume production, to combine different members, and so forth.

In the sixth embodiment described above, the projecting portion 23*bd* which is formed on the upper-end annular surface 23*bc* of the large diameter portion 22*bb* is mentioned as a projecting portion provided on one or more of the lower-end annular surface 22*da* of the cylindrical portion 22*d* and the upper-end annular surface 23*bc* to secure a distance between the two surfaces. However, the present invention is not limited thereto. The projecting portion may be formed on the lower-end annular surface 22*da*, rather than the upper-end annular surface 23*bc*, and may be formed on both the upper-end annular surface 23*bc* and the lower-end annular surface 22*da*.

In the second embodiment described above, the external mount hole 123 of the plate-like member 122 has a simple round shape. However, the external mount hole 123 may be deformed by providing the external mount hole 123 with reduced-diameter remaining portions that are similar to those of the hole 83 of the follower 80 according to the third embodiment or the like.

In the above description of the fourth and fifth embodiments, means for preventing circumferential sliding (relative rotation about the axial line) between the rotor 22 and the rotary shaft 23 was not mentioned. However, engagement with the ribs 22*e* and the engagement recessed portion 23*cc* mentioned in relation to the third embodiment may be assistively used, and engagement with a recessed portion corresponding to the projecting portion 23*bd* or another projecting portion may also be used. Alternatively, circumferential sliding between the rotor 22 and the rotary shaft 23 may be prevented by making friction in the circumferential direction higher than friction in the axial direction by forming a large number of shallow grooves extending in the axial direction to form a striped pattern in the inner peripheral surface of the cylindrical portion 22*d* of the rotor 22 and the outer peripheral surface of the small diameter portion 23*ba* of the rotary shaft 23, for example.

In the sixth embodiment [FIG. 15A] described above, the plurality of cam portions 62 are provided at opposite positions, and disposing the cam portions 62 at such positions smoothly moves the follower 80 and hence the rotor 22 vertically not to generate a force to tilt the rotary shaft 23 and so forth, in order to mitigate or delay damage to the members. If there is no problem with smooth operation of the members or damage to the members, however, the cam portions 62 may be provided at any position, rather than the opposite positions.

INDUSTRIAL APPLICABILITY

The tablet cassette according to the present invention can be applied to any device that includes a drive portion for a tablet feeder to which the tablet cassette is mountable, and can be applied not only to medicine dispensers with a large number of tablet cassettes and tablet feeders such as tablet dispensing apparatuses, but also to medicine dispensers with a single or a small number of tablet cassettes and tablet feeders such as tablet splitting apparatuses and bottling apparatuses. In addition, the tablet cassette according to the present invention can be used not only for full-automatic medicine dispensers, but also for semi-automatic medicine dispensers etc. operable to process tablets one by one upon each manual operation, for example.

DESCRIPTION OF REFERENCE NUMERALS

8' tablet
10' tablet feeder
20' tablet cassette
21 tablet container
22 rotor
22*a* partition wall
22*b* tablet containing space
22*c* additional member containing space
22*d* cylindrical portion
22*da* lower-end annular surface
22*db* downward-facing surface portion
22*e* rib
22*f* bottomed hole
23 rotary shaft
23*a* drive shaft fitting hole
23*b* slit
23*ba* small diameter portion
23*baa* upper end surface
23*bb* large diameter portion
23*bc* upper-end annular surface
23*bd* projecting portion
23*cc* engagement recessed portion
24 discharge path
25 partition member
30 drive portion
31 substrate
32 motor
33 drive shaft
34 discharge sensor
50 tablet cassette
60 engaged member
61 engaged portion
62 cam portion
62*a* upward surface
62B downward surface
70 sliding shaft
71 engaging portion
72 Arm portion
73 coil spring (energy storing member)
80 follower
81 sliding portion
82 circular ring portion
83 hole
90 energy storing member
91 washer
110 tablet cassette
120 tablet cassette
122 plate-like member
123 external mount hole

130 tablet cassette
A difference in height
B amount of interference in vertical direction
C distance between facing surfaces
D length of portion that can be fitted
E length of small diameter portion in axial direction

The invention claimed is:

1. A tablet cassette comprising:

a tablet container including a tablet containing space therein for containing a plurality of tablets in a random manner, and a bottom wall portion having a discharge port to allow the plurality of tablets in the tablet containing space to fall down one by one;

a rotary shaft configured to penetrate the bottom wall portion with an axial line of the rotary shaft extending in a direction that is orthogonal to the bottom wall portion and to be connected to a drive shaft; and a rotor including a rotor body configured to rotate about the axial line together with the rotary shaft in the tablet containing space of the tablet container and having a plurality of tablet receiving portions provided in an outer peripheral portion of the rotor body at predetermined intervals in a circumferential direction to respectively receive the tablet and to allow the tablet to pass therethrough to the discharge port, wherein:

the rotary shaft is hollow;

the tablet cassette further includes:

a plurality of engaged portions continuously provided about the axial line of the rotary shaft at predetermined intervals in the circumferential direction on an annular inner surface region of the bottom wall portion located a predetermined distance away from the rotary shaft, a sliding shaft disposed inside the rotary shaft to rotate together with the rotary shaft and to be slidable in the axial direction to be displaced toward the rotor body when the rotary shaft is coupled to the drive shaft and displaced toward the bottom wall portion when the rotary shaft is not coupled to the drive shaft, and two or more engaging portions provided on the sliding shaft to be engaged with some of the plurality of engaged portions; and wherein:

the rotary shaft and the sliding shaft are operably supported such that the two or more engaging portions are not engaged with the plurality of engaged portions when the rotary shaft is coupled to the drive shaft and the two or more engaging portions are engaged with the plurality of engaged portions when the rotary shaft is not coupled to the drive shaft;

the rotor body includes an additional member containing space therein, the additional member containing space being configured to open toward the bottom wall portion;

a displacement allowing mechanism is configured to allow the rotary shaft to be displaced in the axial direction in a limited range;

at least one cam portion configured to project toward the additional member containing space is provided in an outer annular inner surface region of the bottom wall portion on a radially outer side of the annular inner surface region;

a follower is fixed to the rotary shaft or an inner wall portion of the rotor body, the follower including a sliding portion configured to slide on a cam surface of the cam portion along with rotation of the rotary shaft; and the cam surface is shaped to displace the rotary shaft in the axial direction along with movement of the follower.

2. The tablet cassette according to claim 1, wherein:

the plurality of engaged portions, the two or more engaging portions, a part of the rotary shaft, and a part of the sliding shaft are located in the additional member containing space.

3. The tablet cassette according to claim 2, wherein:

one end of the rotary shaft is fixed to the rotor body via a fitting structure;

a pair of slits are formed at positions facing each other in a radial direction in a portion of the one end of the rotary shaft that is exposed in the additional member containing space; and the two or more engaging portions are a pair of engaging portions provided at a pair of arm portions provided on the sliding shaft to extend out through the pair of slits.

4. The tablet cassette according to claim 1, wherein:

the cam surface includes a gentle upward surface and a steep downward surface;

the follower includes at least one pair of sliding portions configured to face each other in a radial direction of the rotary shaft; and the at least one cam portion includes at least one pair of cam portions configured to face each other in the radial direction of the rotary shaft.

5. The tablet cassette according to claim 1, wherein:

a plurality of partition walls are formed on a surface of an outer peripheral portion of the rotor body to define the plurality of tablet receiving portions;

a partition member is mounted to the tablet container so as to project into the tablet containing space to form a predetermined gap between an upper end of the partition wall and the partition member; and a maximum projecting dimension of the cam portions is larger than a dimension of the predetermined gap between the partition member and the upper end of the partition wall in a height direction.

6. The tablet cassette according to claim 1, wherein the plurality of engaged portions are integrally provided on an annular base and the annular base is fixed to the bottom wall portion.

7. The tablet cassette according to claim 1, wherein:

the plurality of engaged portions are integrally provided on an annular base fixed to the bottom wall portion; and the at least one cam portion is integrally provided on the base.

8. The tablet cassette according to claim 1, wherein:

the rotor body includes a cylindrical portion configured to project into the additional member containing space;

one end of the rotary shaft is fitted with the cylindrical portion; and the cylindrical portion includes an energy storing member therein, the energy storing member being configured to store energy when the rotary shaft is coupled to the drive shaft, and to release the energy to engage the two or more engaging portions with the plurality of engaged portions by pressing the sliding shaft when the rotary shaft is not coupled to the drive shaft.

9. The tablet cassette according to claim 1, wherein the displacement allowing mechanism includes a washer provided at the other end of the rotary shaft which penetrates the bottom wall portion, and an energy storing member disposed between the washer and an outer surface of the bottom wall portion to store energy.

10. The tablet cassette according to claim 1, wherein:

the rotor body includes a cylindrical portion configured to project into the additional member containing space;

the rotary shaft includes a fitted portion to be fitted with the cylindrical portion, and a large diameter portion configured to be continuous with the fitted portion to extend in the additional member containing space; and excessive fitting inhibiting means is provided to avoid full abutment between the cylindrical portion and the large diameter portion by securing a predetermined distance between an end surface of the cylindrical portion and an end surface of the large diameter portion that faces the cylindrical portion when the fitted portion is fitted with the cylindrical portion.

11. The tablet cassette according to claim 10, wherein:

a length of a portion of the cylindrical portion to be fitted with the fitted portion of the rotary shaft is shorter than a length of the fitted portion in the axial direction; and an annular gap is formed between the end surface of the cylindrical portion and the end surface of the large diameter portion that faces the cylindrical portion.

12. The tablet cassette according to claim 11, wherein a ring plate-like member is received in the annular gap, away from the follower.

13. The tablet cassette according to claim 10, wherein a projecting portion is formed on a part of one or both of a lower-end annular surface of the cylindrical portion and an upper-end annular surface of the large diameter portion, and a distance between the lower-end annular surface of the cylindrical portion and the upper-end annular surface of the large diameter portion is secured with the projecting portion and a portion facing the projecting portion abutting against each other when the cylindrical portion and the fitted portion are fitted with each other.

* * * * *